US009811990B2

(12) United States Patent
Kerzner

(10) Patent No.: US 9,811,990 B2
(45) Date of Patent: Nov. 7, 2017

(54) VIRTUAL ENHANCEMENT OF SECURITY MONITORING

(71) Applicant: Alarm.com Incorporated, Tysons, VA (US)

(72) Inventor: Daniel Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/299,609

(22) Filed: Oct. 21, 2016

(65) Prior Publication Data

US 2017/0039829 A1    Feb. 9, 2017

Related U.S. Application Data

(62) Division of application No. 15/069,611, filed on Mar. 14, 2016.

(Continued)

(51) Int. Cl.
*G08B 13/196* (2006.01)
*H04N 5/04* (2006.01)
*H04N 5/232* (2006.01)
*H04N 7/18* (2006.01)
*G06T 19/00* (2011.01)

(Continued)

(52) U.S. Cl.
CPC ...... *G08B 13/19682* (2013.01); *G06T 19/006* (2013.01); *G08B 13/19645* (2013.01); *G08B 25/009* (2013.01); *H04N 5/04* (2013.01); *H04N 5/23216* (2013.01); *H04N 7/181* (2013.01); *G06F 3/04817* (2013.01)

(58) Field of Classification Search
CPC ............ G08B 25/009; G08B 13/19645; G08B 13/19682; G06T 19/006; H04N 5/04; H04N 5/23216; H04N 7/181; G06F 3/04817

USPC ......................................................... 348/159
See application file for complete search history.

(56) References Cited

U.S. PATENT DOCUMENTS

2005/0222820 A1    10/2005  Chung
2008/0291279 A1*  11/2008  Samarasekera .. G08B 13/19693
                                                                                  348/159

(Continued)

OTHER PUBLICATIONS

International Search Report and Written Opinion in International Application No. PCT/US2016/022356, dated Aug. 5, 2016, 12 pages.

*Primary Examiner* — Gims Philippe
*Assistant Examiner* — On S Mung
(74) *Attorney, Agent, or Firm* — Fish & Richardson P.C.

(57) ABSTRACT

Methods, systems, and apparatus, including computer programs encoded on storage devices, for monitoring, security, and surveillance of a property. In one aspect, a system includes a virtual reality headset, a plurality of cameras, a plurality of sensors that includes a first sensor, a control unit, wherein the control unit includes a network interface, a processor, a storage device that includes instructions to perform operations that comprise receiving data from the first sensor that is indicative of an alarm event, determining a location of the first sensor, identifying a set of one or more cameras from the plurality of cameras that are associated with the first sensor, selecting a particular camera from the identified set of one or more cameras; and transmitting one or more instructions to the particular camera that command the particular camera to stream a live video feed to a user interface of the virtual reality headset.

16 Claims, 11 Drawing Sheets

Related U.S. Application Data

(60) Provisional application No. 62/132,496, filed on Mar. 12, 2015.

(51) Int. Cl.
*G08B 25/00* (2006.01)
*G06F 3/0481* (2013.01)

(56) References Cited

U.S. PATENT DOCUMENTS

| | | | |
|---|---|---|---|
| 2010/0033783 A1 | 2/2010 | Klug et al. | |
| 2010/0245585 A1* | 9/2010 | Fisher | H04M 1/6066 348/164 |
| 2013/0063550 A1* | 3/2013 | Ritchey | G03B 37/00 348/36 |
| 2013/0343196 A1* | 12/2013 | Swedo | H04L 43/0817 370/241 |
| 2016/0267759 A1 | 9/2016 | Kerzner | |

* cited by examiner

VIRTUAL ENHANCEMENT OF SECURITY MONITORING

CROSS-REFERENCE TO RELATED APPLICATION

This application is a divisional (and claims the benefit of priority under 35 U.S.C. §121) of U.S. application Ser. No. 15/069,611, filed Mar. 14, 2016, which claims the benefit of U.S. Provisional Application Ser. No. 62/132,496 filed Mar. 12, 2015 and entitled "Virtual Enhancement of Security Monitoring." Both of these prior application are incorporated herein by reference in their entirety.

BACKGROUND

Security and surveillance systems have been utilized for years for both residential and commercial properties. Such systems may utilize a central monitoring system to detect when an alleged intrusion has occurred. For instance, the central monitoring system may be alerted when a motion sensor that has been mounted at a particular portion of the property detects motion. In some instances, the central monitoring system may transmit an alert to an operator's call center, or even local law enforcement that indicates that there may be a break-in at the property from which the alert originated.

Though such security and surveillance systems have certain advantages, such security and surveillance systems necessarily require a human element. That is, in response to the detection of an alert from a sensor, a human is required to respond to, and investigate, the reason why a sensor triggered an alert. This may put a person such as, for example, a property owner, a property custodian, a law enforcement officer, and/or the like at risk of harm.

SUMMARY

Techniques are described for enhancing a security monitoring system using virtual reality components and/or holograms. In some implementations, a user may utilize a virtual reality headset to investigate portions of a property from the safety of a secure room. In the same, or other implementations, one or more holograms may be displayed in order to deter an intruder from proceeding with a home invasion.

According to at least one aspect of the subject matter disclosed by this specification, a method, system, and apparatus, including computer programs encoded on storage devices, are disclosed for monitoring, security, and surveillance of a property. In some aspects, the subject matter in this specification may be embodied in a system that includes a virtual reality headset, a plurality of cameras, a plurality of sensors located at different locations throughout a property, wherein the plurality of sensors include a first sensor, and a monitoring control unit. The monitoring control unit may include a network interface, one or more processors, and one or more storage devices that include instructions that are operable, when executed by the one or more processors, to cause the one or more processors to perform operations that include receiving data from the first sensor that is indicative of an alarm event, determining a location of the first sensor, identifying a set of one or more cameras from the plurality of cameras that are associated with the first sensor, selecting a particular camera from the identified set of one or more cameras and transmitting one or more instructions to the particular camera that command the particular camera to stream a live video feed to a user interface of the virtual reality headset.

These, and other versions, may optionally include one or more of the following features. For instance, the operations may also include notifying a user that an alarm event has been detected. Alternatively, or in addition, the operations may also include transmitting one or more instructions to the particular camera to command the particular camera to sync with the virtual reality headset. Alternatively, or in addition, the operations may also include providing a graphical icon for display on the user interface of the virtual reality headset, wherein the graphical icon is indicative of a detected alarm event that is associated with a second sensor, receiving a selection of the graphical icon, and transmitting one or more instructions to a camera that is associated with the second sensor to stream a live video feed to the user interface of the virtual reality headset. In these, or other, implementations, selecting a particular camera from the set of one or more cameras may include selecting the particular camera that is closest in proximity to the first sensor.

In another aspect, the subject matter in this specification may be embodied in a system that includes a virtual reality headset, a plurality of cameras, a monitoring control unit, wherein the monitoring control unit includes a network interface, one or more processors, and one or more storage devices that include instructions that are operable, when executed by the one or more processors, to cause the one or more processors to perform operations that include receiving a request from the virtual reality headset to access one of the plurality of cameras, providing for display on a user interface of the virtual reality headset a set of one or more graphical icons that each correspond to a particular camera of the plurality of cameras, receiving a selection from a user of a particular graphical icon from the set of one or more graphical icons, and transmitting one or more instructions to a camera that is associated with the particular graphical icon to stream a live video feed to the user interface of the virtual reality headset.

These, and other versions, may optionally include one or more of the following features. For instance, the operations may further comprise transmitting a prompt to the virtual reality headset requesting that the user of the virtual reality headset input authentication information, and receiving authentication information from the user. Alternatively, or in addition, the operations may further comprise transmitting one or more instructions to the camera that is associated with the particular graphical icon that command the camera to sync with the virtual reality headset.

In one implementation, the system may further include a plurality of sensors located at different locations throughout a property, wherein the plurality of sensors include a first sensor, wherein the operations further comprise receiving data from the first sensor that is indicative of an alarm event, and notifying a user that an alarm event has been detected. In this, or other implementations, the plurality of cameras may include at least one camera that is coupled to a robotic device.

In another aspect, the subject matter in this specification may be embodied in a system that includes a plurality of holographic projectors, a plurality of sensors located at different locations throughout a property, wherein the plurality of sensors include a first sensor, a monitoring control unit, wherein the monitoring control unit includes a network interface, one or more processors, and one or more storage devices that include instructions that are operable, when executed by the one or more processors, to cause the one or more processors to perform operations that include receiving data from the first sensor that is indicative of an alarm event; determining a location of the first sensor, identifying a subset of one or more holographic projectors, from the plurality of holographic projectors, that are associated with the first sensor, selecting a particular hologram from multiple stored holograms, and transmitting one or more instructions to at least one of the identified holographic projectors to display the particular hologram.

These, and other versions, may optionally include one or more of the following features. For instance, in one implementation, the particular hologram is a three dimensional hologram. In this, or other, implementations, at least one of the one or more holographic projectors is configured to display a moving hologram.

The one or more instructions may further include an instruction that the at least one of the one or more holographic projectors to display a hologram of a human being that moves from a first room to a second room. Alternatively, or in addition, the system may further comprise a lighting unit in the second room, a control module associated with the lighting unit, wherein the operations further include transmitting one or more instructions to the control module to toggle the lighting unit from off to on when the moving hologram crosses a threshold that exists between the first room and the second room.

In these, or other, implementations, selecting a particular hologram from multiple stored holograms includes selecting a particular hologram from multiple stored holograms based on the threat level that is associated with the alarm event, wherein the threat level of the alarm event may include an intermediate alarm event or a severe alarm event.

In these, or other, implementations, the operations may further include determining that the alarm event is associated with an intermediate level of severity, and, in response to determining that the alarm event is associated with an intermediate level of severity, selecting a hologram that is representative of a human being.

Alternatively, or in addition, the operations may further include determining that the alarm event is associated with a severe threat level, and in response to determining that the alarm event is associated with a severe threat level, selecting a hologram that is representative of a barking dog. In addition, the identified holographic projector may be associated with a speaker.

In these, or other implementations, the operations may further comprise transmitting one or more instructions to at least two of the identified holographic projectors to display the particular hologram.

DETAILED DESCRIPTION

According to at least one aspect of the subject matter disclosed by this specification, a method, system, and a computer program are disclosed that may provide for security, monitoring, and surveillance of a property using virtual reality components and/or holograms.

In one aspect, a user may utilize one or more virtual reality components in order to investigate a detected alarm event. The alarm event may be detected by one, or multiple, sensors that may be strategically placed throughout a property. The virtual reality components may include, for example, a virtual reality headset that is configured to receive data from, and send data to, one or more components of a security monitoring system. For instance, the virtual reality headset may be configured to receive streaming video from one or more cameras associated with a property. The virtual reality headset may allow a user to explore a property in order to investigate an alarm event from the safety of a locked room that may be within the property itself, or remote from the property. In some instances, an interactive model of the property may be provided to the user via the virtual reality headset. The model may be generated from one, or multiple, cameras that may be configured to capture images of the property.

In addition, or alternatively, other aspects may utilize one or more projectors to display images and/or holograms in response to an alarm event in order to deter a menacing intruder from further encroachment into a property. For instance, the security monitoring system may instruct one or more projectors to project a 2-dimensional image onto a surface such as a wall of the property. Alternatively, or in addition, the security monitoring system may instruct one or more projectors to project a hologram into a nearby space that appears to be three-dimensional to a viewer. Each projector may be capable of displaying multiple different types of holograms. In some implementations, a projector may be configured to project a particular hologram that is selected from multiple candidate holograms based on a detected alarm event.

Figure 1:
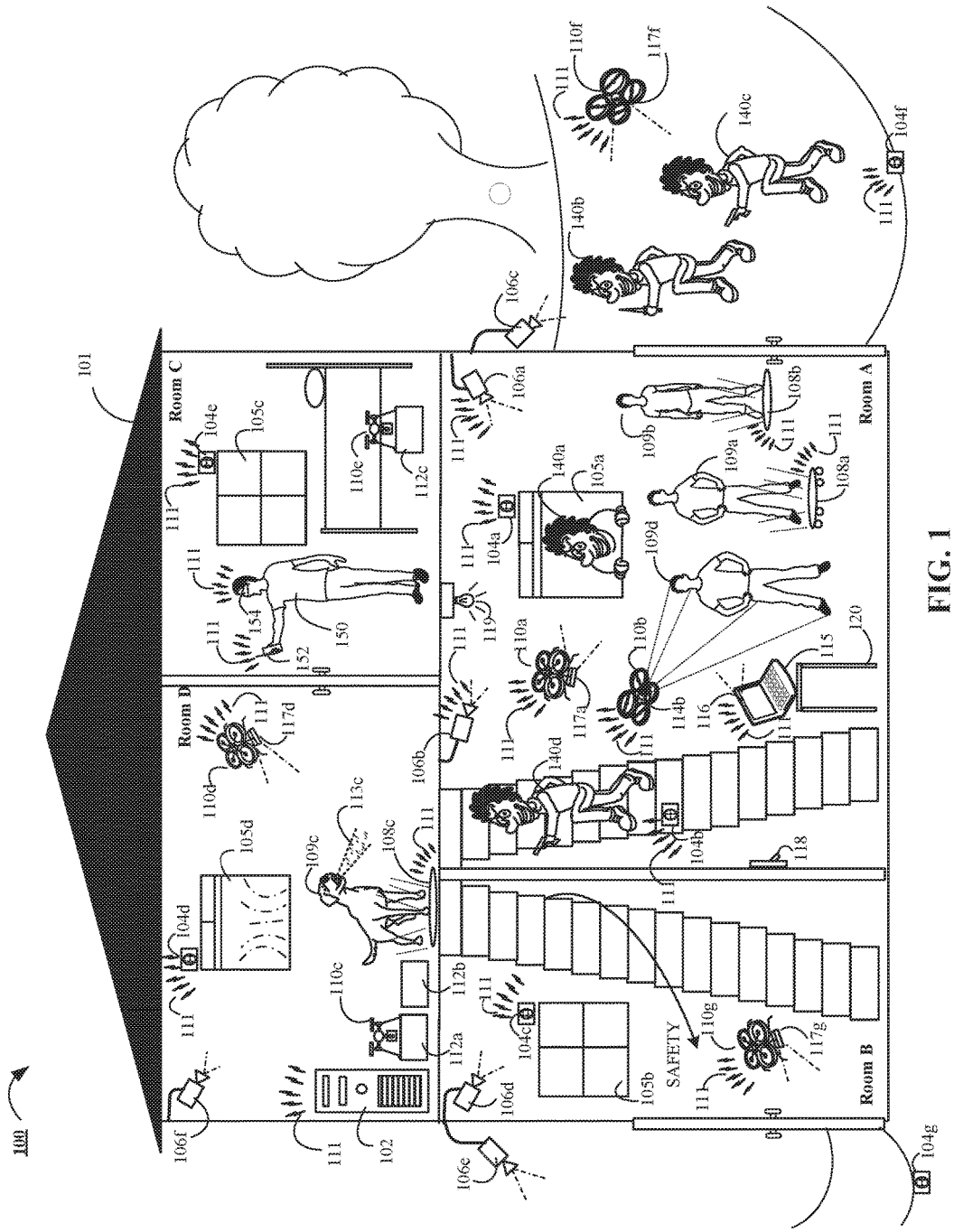
FIG. 1 is a contextual diagram showing features of an example of a security monitoring system employed in a property that has been augmented using virtual reality components and holographic projectors.

FIG. 1 is a contextual diagram showing features of an example of a security monitoring system 100 employed in a property 101 that has been augmented using virtual reality components and holographic projectors.

The security monitoring system 100 employed by property 101 may include, for example, central monitor control unit 102, multiple sensors 104a, 104b, 104c, 104d, 104e, 104f, 104g, multiple cameras 106a, 106b, 106c, 106d, 106e, 106f, multiple holographic projectors 108a, 108b, 108c, multiple robotic devices 110a, 110b, 110c, 110d, 110e, 110f, 110g, multiple robotic device charging stations 112a, 112b, 112c, a mobile device 152 and/or a virtual reality headset 154. Features of security monitoring system 100 may be described within the context of a property invasion being attempted by multiple burglars 140a, 140b, 140c, 140d.

The security monitoring system 100 may facilitate networked communication between each component of security monitoring system 100 including, for example, the central monitor control unit 102, sensors 104a, 104b, . . . 104g, cameras 106a, 106b, . . . 106f, holographic projectors 108a, 108b, 108c, robotic devices 110a, 110b, . . . 110g, robotic device charging stations 112a, 112b, 112c, mobile device 152, and/or the virtual reality headset 154 via network 111. The network 111 may include, for example, any type of wired or wireless network that facilitates communication between the components of the security monitoring system 100 including a local area network, a wide area network, or multiple networks working together including, but not limited to, the Internet.

One or more the components of security monitoring system 100 may include a data capture device. Such components may transmit the captured data via one or more data feeds to the central monitor control unit 102 via network 111. The data feeds may be transmitted continuously, periodically, and/or upon request. The data feed may include one or more discrete pieces of data collected by a data capture device such as, for example, a single digital photograph. Alternatively, or in addition, the data feed may include a consistent stream of data that is being captured, and relayed to central monitor control unit 102, in real time such as, for example, a live video feed. Alternatively, or in addition, the data feed may include real-time readings from one or more sensors.

In one implementation, the central monitor control unit 102 may provide an instruction to one or more components of security monitoring system 100 instructing the one or more components to direct the one or more component's data feed to another component of security monitoring system 100. For instance, the central monitor control unit 102 may transmit an instruction to a camera 106a that instructs camera 106a to transmit a live video feed to the user's 150 virtual reality headset 154. Alternatively, or in addition, the user 150 may make a direct request to camera 106a to provide a live video feed to the user's 150 virtual reality headset 154.

The components of security monitoring system 100 that may include one or more data capture devices are sensors 104a, 104b, . . . 104g, cameras 106a, 106b, . . . 106f, robotic devices 110a, 110b, . . . 110g, and/or the like. For instance, the sensors 104a, 104, . . . 104f may be configured to capture data related to aspects of the property 101 in the vicinity of the sensor such as, for example, data indicative of movement on a staircase, data indicative of the force applied to a window, data indicative of a temperature, data indicative of the presence of water, and/or the like. Separately, cameras 106a, 106b, . . . 106f may capture, and transmit, real time video feeds and/or digital photographs. Alternatively, or in addition, cameras 106a, 106b, 106f may also be associated with a microphone that may capture any audible noises that may be detected in the vicinity of the microphone. Cameras and/or microphones may also be mounted on a robotic device such as, for example, robotic device 110a, 110b, . . . 110g. Camera and/or microphone equipped robotic devices such as, for example, robotic device 110a that is coupled to a camera 117a may also capture video and/or audio that may be transmitted to central monitor control unit 102 via network 111, or another component of security monitoring system 100, as a real time data feed. The central monitor control unit 102 may analyze the received feeds, store the received feeds, transmit the feeds to a system operator, transmit the feeds to local law enforcement, transmit the feeds to a lawful property occupant's 150 mobile device 152, transmit the feeds to a lawful property occupant's 150 virtual reality headset 154, or the like. Alternatively, or in addition, one or more of aforementioned data feeds, and/or other data feeds, may be transmitted directly to the lawful property occupant's 150 virtual reality headset 154 via network 111 without being first transmitted through the central monitor control unit 102. For instance, upon the detection of an alarm event, the central monitor control unit 102 may instruct one or more cameras 106a, 106b, . . . 106f to transmit a live video feed to the display of a user's virtual reality headset 154.

Based on the analysis of the received feeds, or in response to a request from a user 150, the central monitor control unit 102 may transmit an instruction to one or more holographic projectors 108a, 108b, 108c. The instruction may instruct one or more of the holographic projectors 108a, 108b, 108c to display a hologram such as holograms 109a, 109b, 109c, respectively. Alternatively, or in addition, central monitor control unit 102 may also deploy one or more robotic devices 110a, 110b, . . . 110g based on the analysis of the received data feeds.

The central monitor control unit 102 may be configured to receive notifications of alarm events from each sensor 104a, 104b, . . . 104f that is installed on the inside, or on the outside, of a particular property 101. Sensors 104a, 104b, . . . 104f may include any type of sensor or detector that may monitor a property to identify an alarm event. For instance, sensors 104a, 104b, . . . 104f may include, for example, a contact sensor, a motion sensor, a glass break sensor, or any other sensors that may be configured to detect a potential property invasion by an intruder such as, for example, burglar 140a, 104b, 140c, 140d. However, sensors 104a, 104b, . . . 104f may also include environmental sensors, health sensors, or the like. The sensors 104a, 104b, . . . 104f may broadcast notifications of potential alarm events that may be received by central monitor control unit 102 using a network connection 111. The central monitor control unit 102 may instruct one or more holographic projectors 108a, 108b, 108c to display a hologram based on the received alarm event notification. In some implementations, the central monitor control unit 102 may select a particular holographic projector to display a particular hologram based on proximity of the holographic projector to the location associated with a detected alarm event. However, other factors may be considered by central monitor control unit 102 in determining the particular holographic projector that should be used to display a particular hologram.

The holographic projectors such as holographic projectors 108b, 108c may be stationary units that may be placed in particular locations of a property. For example, one or more holographic projectors such as, for example holographic projector 108b may be placed in Room A of a property 101 and another holographic projector 108c may be placed in Room D of property 101. Placement of one or more holographic projectors 108b, 108c may be strategic. For example, holographic projectors may be placed in particular locations of property 101 that may deter a burglar 140a from entering the property 101. Such particular locations may include, for example, inside portions of property 101 that may be seen from outside areas surrounding the property 101. For instance, one or more holographic projectors may be placed near windows, doors, or the like in a manner that allows the holograms projected by one or more of the holographic projectors to be seen from outside the property 101.

Alternatively, or in addition, such locations may include, for example, points within a property 101 that may be associated with a transition from a first room to another room. For instance, a holographic projector 108c may be positioned in Room D at the top of a set of stairs, around the corner of an intersection of two or more hallways, or the like. The placement of a holographic projector in areas of transition within a property 101 may provide the illusion that a first room of a property such as, for example, Room D is occupied, even though another room of the property such as, for example, Room A is unoccupied. The purpose of such an illusion may be to try to frighten away an intruder such as, for example, burglar 140d that has already entered into the property. Such a burglar 140d present on the staircase may be frightened, and decide to flee the property 101 if the burglar 140d thinks that Room D is occupied by a property 101 owner, a property 101 occupant, a pet of the property 101 owner/occupant, or the like.

The holographic projectors 108b, 108c are generally depicted in FIG. 1 as being stationary. However, the subject matter of this specification need not be so limited. In one implementation, it is considered that the holographic projectors may not be stationary. For instance, a holographic projector 108a may be coupled to a robotic device that is mobile. The mobile robotic device may include one or more wheels. Such mobile holographic projectors may be remotely deployed and controlled by central monitor control unit 102, mobile device 152, and/or user interaction with a virtual reality model of one or more aspects of property 101 that is viewed via a virtual reality headset 154. One or more mobile holographic projectors may help to produce the illusion that an occupant of the property 101 is present by, for example, moving a displayed hologram throughout the property from one room to another room. Such movement may be dynamically control by the central monitor control unit 102, user 150 using a mobile device 152, and/or user interaction with a virtual reality model using a virtual reality headset 154.

FIG. 1 provides an example where each of the holographic projectors 108a, 108b, 108c are a single unit projector, and positioned at, or near, the floor of their corresponding rooms. However, the present disclosure need not be so limited. Instead, each holographic projector 108a, 108b, 108c may be comprised of one or multiple projectors. Alternatively, or in addition, holographic projectors 108a, 108b, 108c may be mounted on any surface including, for example, the floor, ceiling, and/or walls. In some implementations, multiple holographic projectors may be required to generate any one particular two-dimensional image or three-dimensional hologram.

Each holographic projector may be configured to display one or more holograms such as, for example, hologram 109a, hologram 109b, and/or hologram 109c. The holograms 109a, 109b, 109c may be representative of any three-dimensional object such as, for example, a person, an animal, or the like. The three-dimensional object may be associated with a high definition, or greater (e.g., 4K UHD), resolution that provides the appearance of a life-like object. In some instances, the three-dimensional object may be a custom, holographic representation that looks substantially similar to a particular person. For instance, one or more holographic projectors utilized by the security monitoring system 100 may be configured to display a hologram into the air of an open space of property 101 that looks like the user 150, who may be a legal occupant of the property 101. Alternatively, or in addition, a holographic projector may display a hologram 109c in the air of an open space of property 101 that looks like an animal such as, for example, a vicious, barking dog 109c. Other types of holograms depicting any other known object may also be displayed by a holographic projector utilized by security monitoring system 100. The type of hologram that is projected may be determined, for example, based on the severity of a detected alarm event.

Alternatively, or in addition, one or more of the holographic projectors may display a two-dimensional image. For instance, one or more holographic projectors may project a two-dimensional image of any known object onto a surface associated with property 101. The two-dimensional image may be, for example, a high definition, or greater (e.g., 4K UHD), resolution image that provides the substantially life-like image of an object such as a person, an animal, or the like. In some instances, the two-dimensional object may be a custom image that looks substantially similar to a particular person. For instance, one or more holographic projectors utilized by the security monitoring system 100 may be configured to display an image onto a surface associated with a property 101 that looks like user 150, who may be a legal occupant of the property 101. Alternatively, or in addition, a holographic projector may display an image onto a surface associated with a property 101 that may look like an animal such as, for example, a vicious, barking dog. Other types of images depicting any other known object may also be displayed by a holographic projector utilized by security monitoring system 100.

The robotic devices 110a, 110b, . . . 110g of security monitoring system 100 are depicted as flying devices such as, quad-copters. However, other types of robotic devices may be used with security monitoring system 100. For instance, rolling helicopter type robotic devices, and land based robotic devices may also be used. The robotic devices 110a, 110b, . . . 110g may be equipped with a variety of different tools to assist with security management and surveillance of a particular property. Such tools may vary in scope and may serve one or purposes such as, for example, deterring a burglar 140a, 140b, 140c, 140d from following through with an attempted home invasion. For instance, a robotic device such as, for example, robotic device 110b may be equipped with a holographic projector 114b. The holographic projector 114b may be configured to display a two-dimensional image or a three-dimensional hologram in the same manner as described with respect to holographic projectors 108a, 108b, 108c. For example, the holographic projector 114b may display a hologram of a person 109d. Robotic devices equipped with a holographic projector such as, for example, robotic device 110b, provide flexibility in the placement of the display of a two-dimensional image or three-dimensional hologram. For example, robotic devices coupled with a holographic projector 114b allow a central monitor control unit 102, or a user 150, to dynamically configure placement of two-dimensional images and/or three dimensional holograms in real-time during a home invasion, or an attempted home invasion, in an effort to prevent, interrupt, or deter an attempted home invasion by one or more burglars 140a, 140b, 140c, 140d. Such dynamic configuration of two-dimensional images and/or three dimensional holograms may be based on data that was received as part of one or more alarm event notifications.

In some aspects, central monitor control unit 102 may store predetermined configurations of holograms. A predetermined configuration of holograms may provide for a particular arrangement of holographic projectors 108a, 108b, 108c, 114b. In some instance, a predetermined configuration may include data that identifies a particular subset of holographic projectors from a set of available holographic projectors 108a, 108b, 108c, 114b. Alternatively, or in addition, a predetermined configuration may include one or more navigation paths to be executed by one or more robotic devices that are coupled to a holographic projector. The particular navigation path may be a navigation path that is followed by a robotic device as the robotic device travels to a particular location associated with a detected alarm event. Alternatively, or in addition, the particular navigation path may also be a navigation path that is followed by a robotic device after the robotic device reaches a portion of the property 101 that is associated with an alarm event. For instance, a navigation path may include a displayed hologram 109a moving back and forth in view of a window 105a. A predetermined configuration may also include a particular order of display of one or more holograms 109a, 109b, 109c, 109d. Alternatively, or in addition, a predetermined configuration may also include a particular image or hologram, or sequence of images or holograms, to be displayed by one or more particular holographic projectors. Alternatively, or in addition, a predetermined configuration may also include one or more sounds that should be played back by an output speaker associated with a holographic projector. For example, a hologram of a vicious, barking dog 109c may also be accompanied by sounds 113c of a dog barking using a speaker that is associated with the holographic projector 108c, regardless of whether the speaker is actually coupled to the holographic projector 108c. For instance, the speaker may be connected to the holographic projector 108c using Bluetooth. Alternatively, the security monitoring system 100 may utilize a home's surround sound speakers to output sounds 113c.

A predetermined configuration may be associated with a particular threat level. For instance, a first particular predetermined configuration may be associated with a low threat level. Such a particular predetermined configuration may be designed to deter a burglar 140a from attempting to enter a property 101. For example, a predetermined configuration associated with a low threat level may include activating one or more holographic projectors to project one or more holograms of one or more people moving around inside the property 101. Alternatively, or in addition, such a predetermined configuration for a low threat level may include synchronizing the lights with the one or more holograms so that lights turn on when a hologram enters a room, and subsequently turn off when the user leaves the room.

Alternatively, a second particular predetermined configuration may be, for example, associated with a high threat level. Such particular configuration may be designed to frighten away a particular burglar 140d who has entered the property 101. For example, a predetermined configuration associated with a high threat level may include activating one or more holographic projectors to display a vicious, barking dog. Alternatively, or in addition, a predetermined configuration associated with a high threat level may include projecting a hologram of the user 150 with a gun. One or more of the aforementioned holograms may have the effect of frightening away a burglar 140d who has already entered the property 101.

The charging stations 112a, 112b, 112c may each provide a platform for recharging each of the robotic devices 110a, 110b, . . . 110g. The charging stations 112a, 112b, 112c may include contact-based charging systems, or wireless charging systems. The robotic devices 110a, 110b, . . . 110g may be configured to drive onto, land on, or fly near, the charging stations in order to recharge the battery that powers each respective robotic device. Each robotic device 110a, 110b, . . . 110g may be assigned to a particular charging station 112a, 112b, 112c. Alternatively, or in addition, a security monitoring system 100 may not utilize any predetermined charging station assignments. For instance, a charging station 110b may communicate its occupancy status to a central monitor control unit 102. Then, each of the robotic devices 110a, 110b, . . . 110g may communicate with the central monitor control unit 102 to request a charging station when the robotic device's battery falls below a predetermined threshold. The central monitor control unit 102 may command the robotic device to navigate to a particular charging station based on consideration of at least the charging station's occupancy status and location. In some implementations, a particular robotic device 110a, 110b, . . . 110g may be able to directly communicate with a particular charging station via network 111 in order to determine the charging station's occupancy status and/or location.

A user 150 may utilize a virtual reality headset 154 to observe aspects of property 101. In one implementation, a user may receive a user notification that an alarm event notification has been received by a central monitor control unit 102. The user 150 may put on the virtual reality headset 154 in response to receiving the user notification. The user 150 or central monitor control unit 102 may select one or more video feeds to be displayed on the virtual reality headset's 154 user interface from one or more cameras 106a, 106b, . . . 106f and/or robotic device cameras 117a, 117d, 117f, 117g. The virtual reality headset 154 may allow the user to switch between the aforementioned feeds. As result, a user 150 can use the virtual reality headset 154 during a home invasion by one or more burglars 140a, 140b, 140c, 140d to view one or more rooms of a property 101 in order to find a route to safety that exits the property without running into a burglar 140a, 140b, 140c, 140d.

The virtual reality headset 154 may be used to create an interactive augmented reality environment that allows a user to interact with components of the security monitoring system 100 and/or the property 102. The augmented reality environment may be created by generating a model based on the integration of multiple image and/or video feeds obtained for a particular room of property 101. For example, an augmented reality model for Room A or property 101 may be created by generating a model based on images and/or video feeds obtained from camera 106a, camera 106b, camera 117a, and camera 116. A user may interact with the augmented reality environment by, for example, moving a virtual table that corresponds to table 120 in order to see if there is a burglar, or other intruder, hiding behind the table 120.

In another aspect, operation of one or more controls associated with a user's property 101 may become interactive via the augmented reality model. For example, a property's lighting system may be integrated into the augmented reality model. In such a model, a user 150 may select virtual light switch that corresponds to light switch 118 in order to turn on light 119 in Room A. Alternatively, or in addition, a user 150 may be able to interact with a virtual model of a sound system in order to initiate playback of the user's surround sound system in Room A. By interacting with the augmented reality environment, a user 150 may be able to create the appearance that property 101 is occupied, and therefore deter a potential burglar 140*a* from following through on a home invasion into property 101.

In another aspect, a user may interact with the augmented reality environment to create one or more predetermined configurations of holograms. For example, while wearing the virtual reality headset 154, and viewing an augmented reality model of property 101, the user 150 may identify a particular place where the user 150 wants a particular hologram to be displayed. In response to the user's request submitted through the augmented reality environment, one or more holographic projectors 108*a*, 108*b*, 108*c* may adjust the direction of their respective projectors in order to display the hologram in the particular location identified by the user 150 in the augmented reality model.

Components of the security monitoring system 100 may work together in response to a home invasion by one or more burglars 140*a*, 140*b*, 140*c*, 140*d* as illustrated with respect to Room A of property 101. For instance, sensor 104*a* may detect that a burglar 140*a* has attempted to break-in to the property 101 via a window 105*a*. In response to the burglar's 140*a* jostling of the window 105*a*, the sensor 104*a* may broadcast a notification of an alarm event via network 111. The central monitor control unit 102 may receive the broadcasted alarm event notification, and instruct a holographic projector such as, for example, mobile holographic projector 108*a* to display a three dimensional hologram. The mobile holographic projector 108*a* may realistically introduce the hologram 109*a* in a manner that appears organic. For instance, the hologram 109*a* that is being projected by the mobile holographic projector 108*a* may be used to provide the appearance that the hologram 109*a* walked into the Room A from another Room B.

Alternatively, or in addition, the security monitoring system 100 may be configured to synchronize the lighting system of Room A with one or more holographic projectors such as, for example, mobile holographic projector 108*a* such that the light 119 turns on when the hologram 109*a* (or mobile holographic projector 108*a*) enters Room A. The entrance of hologram 108*a* into Room A and the turning on of light 119 may provide the illusion that property 101 is occupied, and therefore deter burglar 140*a* from entering the property. Such organic introduction of hologram 109*a* may be beneficial when an alarm event detects the presence of a burglar 140*a* at a window 105*a*.

Alternatively, or in addition, the central monitor control unit 102 may also dispatch one or more robotic devices 110*a*, 110*b* to the location of the property 101 that is associated with the alarm event. For instance, a robotic device 110*a* may be dispatched in order to provide another camera 117*a* that can be used to investigate aspects of Room A that are outside of the line of sight of camera 106*a*, 106*b*. Alternatively, or in addition, for example, a robotic device 110*b* may be provided in order to introduce another hologram 109*d* into Room A in an effort to provide a greater sense of occupancy. The robotic device 110*b* may realistically introduce the hologram 109*d* into Room A in a manner that seems organic. For instance, hologram 109*d* can be displayed in a manner that shows the hologram 109*d* walking into Room A from Room B.

Alternatively, there may exists certain scenarios where an organic introduction of holograms 109*a*, 109*b* is not necessary. For instance, property 101 may have one or more sensors 104*f* that are scattered around the perimeter of the property 101. The sensor 104*f* may be a motion sensor, weight sensor, or the like that detects the presence of an object such as, for example, burglars 140*b*, 140*c*. In response to the detection of one or more objects by sensors 104*f*, the sensor may broadcast an alarm event notification that is detected by central monitor control unit 102. In response to the alarm event notification, the central monitor control unit 102 may instruct one or more holographic projectors 108*a*, 108*b*, 114*b* to display one or more holograms 109*a*, 109*b*, 109*d*, respectively. Since burglars 140*b*, 140*c* are outside the property in the driveway, holograms 109*a*, 109*b*, 109*d* need not be displayed organically. In some implementations, such inorganic display of holograms may also be utilized as part of a time-based security system. For instance, central monitor control unit 102 may be programmed to instruct one or more holographic projectors to display holograms 109*a*, 109*b*, 109*d* on a set time schedule such as, for example, every night at 7:30 pm EST, weekdays after dark, or the like.

Holograms 109*a*, 109*b*, 109*d* depicted in FIG. 1 may be displayed in response to an intermediate level threat. The threat is determined to be an intermediate level threat because, for instance, the burglars 140*a*, 140*b*, 140*c* are still outside the property. As a result, central monitor control unit 102 may determine that humanoid holograms should be displayed to create the illusion that property 101 is occupied in an effort to deter the burglars 140*a*, 140*b*, 140*c* from entering the property 101. In one implementation, the humanoid holograms may be photo-realistic representations of the user 150, who may be a lawful occupant of the property 101. The humanoid holograms displayed in response to an intermediate threat may show the user 150 performing day to day tasks such as, for example, watching TV, reading a book, talking on a mobile phone, or the like. However, the central monitor control unit 102 may instruct a holographic projector to display different holograms based on the detection of a more severe threat.

For instance, a burglar 140*d* may have entered into the property 101, and begun to further invade the property 101 by running up the stairs connecting Room A to Room D. A sensor 104*b* may detect motion, weight, or the like that is indicative of the presence of burglar 140*d*. In response to the detection of burglar 140*d* by sensor 104*b*, the sensor 104*b* may broadcast an alarm event notification that is detected by central monitor control unit 102. In response to the alarm event notification, the central monitor control unit 102 may instruct one or more holographic projectors such as holographic projector 108*c* to display a hologram 109*c*. In this instance, since burglar 140*b* is detected as being inside property 101, central monitor control unit 102 has determined to employ a more aggressive hologram 109*c* that takes the form a vicious, barking dog. The holographic projector 108*c* may use associated speakers to output audio signals 113*c* that mimic the sound of a dog barking. The visual and audio appearance of the vicious, barking dog hologram 109*c* may frighten away burglar 140*d*.

Though a vicious, barking dog hologram 109*c* is used in this example, other types of holograms may be displayed in response to threats that the central monitor control unit 102 perceives as severe. For instance, a holographic projector such as, holographic projector 108*c* may be configured to display a hologram of a person with a shotgun, or other type of weapon. The hologram of the person with the shotgun may, for example, show the person using a pump action shotgun to chamber a round. In addition, the holographic projector's associated speaker may output the distinct sound of a round being chambered in a pump action shotgun. The combination of the hologram of a person with the shotgun, and associated sounds, may frighten burglar 140*d*, and convince the burglar 140*d* to flee property 101.

A user 150, who may be a lawful occupant of the property 101, may be notified by a central monitor control unit 102 when an alarm event notification is detected. The user 150 may receive the notification from the central monitor control unit 102 via the user's mobile device 152. The user's mobile device 152 may include, for example, a mobile phone, smart phone, tablet, smart watch, laptop, or the like. Alternatively, or in addition, the user 150 may be notified of an alarm event by one or more visual or audio messages transmitted through property 101 such as, for example, flashing lights, sirens, audio messages warning of an intruder, or the like. Facing potentially dangerous circumstances, the user 150 may run to a room in the property 101 that is safe such as, for example, Room C. Once in Room C, the user 150 may put on virtual reality headset 154.

Virtual reality headset 154 may allow a user 150 to investigate each alarm event detected by the central monitor control unit 102 and/or one or more sensors 104a, 104b, . . . 104g. For example, the virtual reality headset 154 may be configured to receive one or more video feeds from one or more cameras associated with property 101. The video feeds may come from a stationary camera such as, for example, 106a, 106b, . . . 106f. Alternatively, or in addition, the video feeds may come from cameras coupled to one or more robotic devices 110a, 110f. Alternatively, or in addition, the video feeds may come from one or more cameras 116 that may be associated with one or more consumer electronics devices that are integrated with the security monitoring system 100 such as, for example the laptop 115. To the extent there is one or more aspects of property 101 that the user cannot see via one or more available cameras, a user may deploy a robotic device such as robotic device 110f that is equipped with a camera 117f The user 150 may direct the robotic device 110f to the blind spot via the virtual reality environment created via the virtual reality headset 154. Accordingly, the user 150 can use the virtual reality environment provided by the virtual reality headset 154 to investigate each aspect of the property during a home invasion.

The user 150 may utilize the virtual reality headset 154 to plan a route to safety. For instance, the user can switch between camera feeds and determine that there are burglars 140b, 140c at the front door, a burglar 140a in the window 105a in Room A, and a burglar coming up the stairs to Room D. However, user 150 may view the video feeds from camera 106f, camera 106d, and camera 106e to determine that there is a path to safety that exists down the steps from Room D to Room B, and out the back door. Alternatively, or in addition, the user 150 may use the virtual reality headset 154 and/or a mobile device 152 to instruct a robotic device 110g with a camera 117g to traverse the path to safety, and provide the video feed to the virtual reality headset 154 via network 111, to ensure there are no burglars on the proposed path. The user 150 may use the virtual reality headset 154 and/or the mobile device 152 to activate holographic projector 108c to provide a display of a vicious, barking dog hologram 109c. The vicious, barking dog hologram 109c may frighten away, or at least startle, the burglar 140d, and allow the user 150 to run down the back stairs, and out the back door to safety. Video streams from one or more cameras may be fed to the virtual reality headset 154 and/or the user's mobile device 152 as the user exits the property 101.

Figure 2:
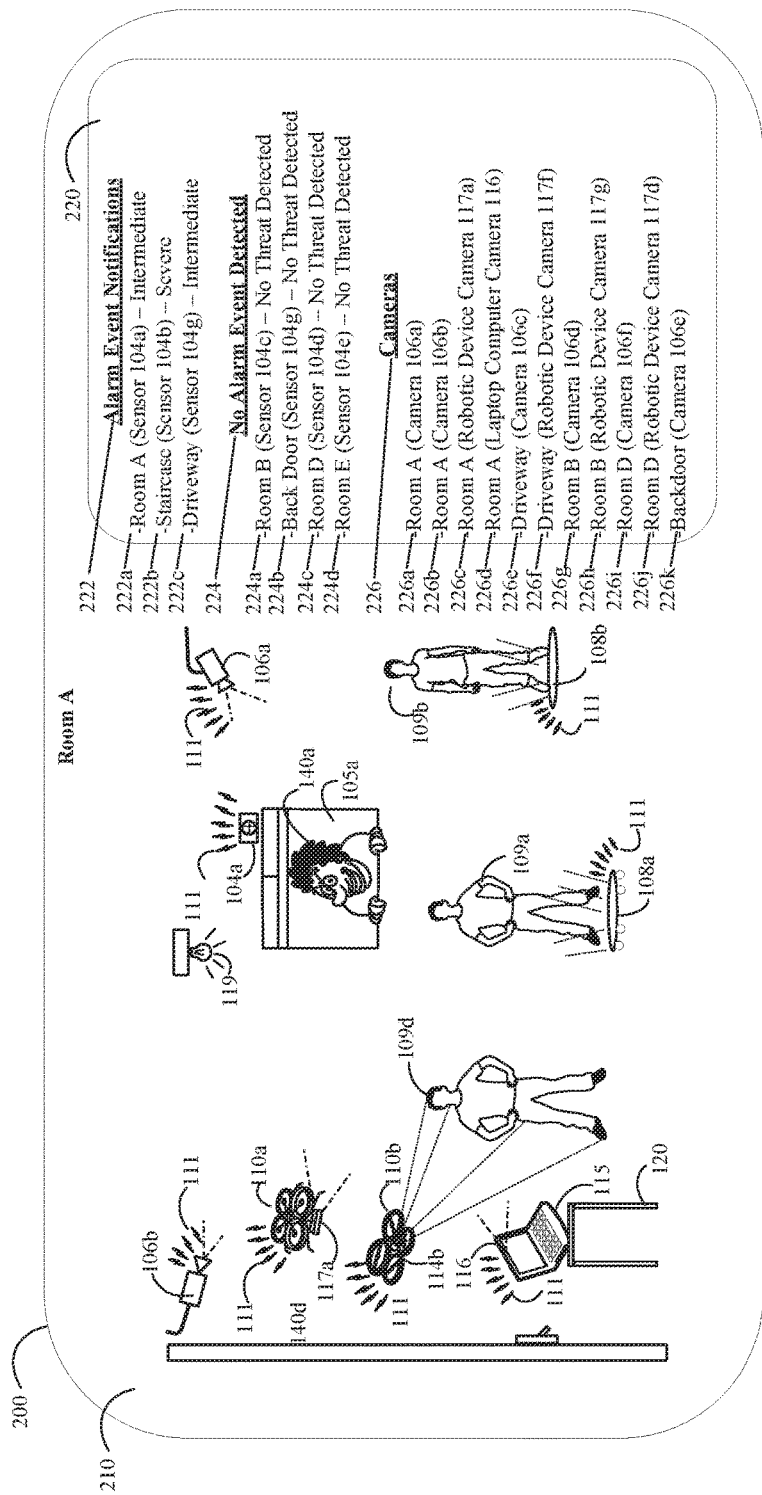
FIG. 2 is an example of a user interface that may be provided via the display of a virtual realty headset.

FIG. 2 is an example of a user interface 200 that may be provided via the display of a virtual realty headset 154.

The display of the virtual reality headset 154 may be configured to provide a live video feed from one or more cameras 106a, 106b, . . . 106f associated with the security monitoring system 100. In the example of FIG. 2, the live video feed 210 of Room A is being streamed to the user interface 200 of the virtual reality headset 154 display. Alternatively, or in addition, the virtual reality headset 154 user interface may provide an alarm event management center 220.

The alarm event management center 220 may include an alarm event notifications section 222, a no alarm event detected section 224, and a cameras section 226. The alarm event notifications section 222 may provide one or more graphical icons 222a, 222b, 222c that are each associated an active alarm event that has been detected by central monitor control unit 102. An alarm event may be detected by the central monitor control unit 102 receiving an alarm event notification from one or more sensors associated with the security monitoring system 100. Each graphical icon 222a, 222b, 222c provided in the alarm event notifications section may be associated with an indication of the severity of the alarm event that is associated with the graphical icon 222a, 222b, 222c. For instance, the graphical icons 222a and 222c that correspond to the alarm events in Room A and the Driveway, respectively, are indicated as being intermediate. The alarm events that are associated with Room A and the Driveway may be categorized as intermediate because, for example, the alarm events are based on data from sensors 104a, 104f that indicate that the burglars 140a, 140b, 140c have not yet entered into property 101.

As another example, the graphical icon 222b that corresponds to the alarm event on the Stairs is indicated as severe. The alarm event that is associated with the Staircase 222b may be categorized as severe because, for example, the alarm event is based on data from sensor 104b that indicates that the burglar 140d is inside the property 101. The severity of an alarm event may be indicated with text words that include, for example, negligible, intermediate, severe, or the like. Alternatively, or in addition, the severity of an alarm event may be indicated with the use of colors. For example, a negligible alarm event may be displayed in green text, an intermediate alarm event may be displayed in yellow text, a severe alarm may be displayed in red text, or the like. The negligible alarm event indicator may indicate a low level of threat that is associated with the alarm event. The intermediate alarm event indicator may indicate a moderate level of threat that is associated with the alarm event. The severe alarm event indicator may indicate a high level of threat that is associated with the alarm event.

Each of the graphical icons 222a, 222b, 222c associated with an alarm event may be interactive. For instance, a user may select one or more of the graphical icons 222a, 222b, 222c in order to switch to a live video feed from a camera that is associated with the alarm event that corresponds to the selected graphical icon. A user may select one or more of the graphical icons 222a, 222b, 222c by gazing at the icon. The virtual reality headset 154 may detect the user's gaze focused on the graphical icon and receive it as a selection. Alternatively, or in addition, the user may utter a voice command that instructs the virtual reality headset to select a particular graphical icon. For example, a user 150 may instruct the virtual reality headset to "display video associated with the alarm event in Room A," or the like. The virtual reality headset may be equipped with one or more microphones and a speech recognizer to process such instructions. Graphical icons associated with other aspects of alarm event management center 220 may be selected in a similar manner.

In one implementation, for example, selection of a graphical icon 222a, 222b, 222c in the alarm events notifications 222 section may select a default camera that is associated with the location of the alarm event. Live video from the default camera may then be streamed to the user interface 200 of the virtual reality headset 154. If a camera that corresponds to the selected location is not available, then the central monitor control unit 102 may instruct a robotic device such as robotic device 110*a* that is equipped with a camera to navigate to the identified location and return a live video feed associated with the location to the user's 150 virtual reality headset 154 via network 111.

Alternatively, or in addition, the alarm event management center 220 may include a no alarm event detected section 224. The no alarm event detected section 224 may provide one or more graphical icons 224*a*, 224*b*, 224*c*, 224*d* that are each associated with a sensor that has not detected an alarm event and/or has not transmitted an alarm event notification. Alternatively, or in addition, the graphical icons 224*a*, 224*b*, 224*c*, 224*d* may be associated with a sensor that has transmitted an alarm event notification in the past but is no longer detecting the presence of an object. Notifying the user 150 that the sensors have not, or are no longer, reporting an alarm event may help the user 150 plan an escape route from the property 101. A user 150 may select one or more of the graphical icons 224*a*, 224*b*, 224*c*, 224*d* in order to switch to a live video feed of a portion of property 101 that is associated with the sensor that corresponds to the selected graphical icon. In one implementation, for example, selection of a graphical icon 224*a*, 224*b*, 224*c* in the no alarm events detected section 224 may select a default camera that is associated with the sensor that corresponds to the selected graphical icon. Live video from the default camera may then be streamed to the user interface 200 of the virtual reality headset 154. If a camera that corresponds to the selected location is not available, then the central monitor control unit 102 may instruct a robotic device such as robotic device 110*a* that is equipped with a camera to navigate to the identified location and return a live video feed associated with the location to the user's 150 virtual reality headset 154 via network 111.

Alternatively, or in addition, the alarm event management center 220 may include a cameras section 224. The cameras section 226 may provide one or more graphical icons 226*a*, 226*b*, 226*c*, 226*d*, 226*e*, 226*f*, 226*g*, 226*h*, 226*i*, 226*j*, 226*k* that are each associated with a particular camera that can be accessed to provide a live video feed to the user's 150 virtual reality headset 154. The camera section 224 may include graphical icons that are each associated a particular camera being employed by the security monitoring system 100 including for example, cameras 106*a*, 106*b*, . . . 106*f*, robotic device cameras 117*a*, 117*f*, 117*d*, 117*g*, and laptop camera 116. A user 150 may select one or more of the graphical icons 226*a*, 226*b*, 226*c*, 226*d*, 226*e*, 226*f*, 226*g*, 226*h*, 226*i*, 226*j*, 226*k* in order to switch to a live video feed that is associated with the camera that corresponds to the selected graphical icon. The camera section 224 may thus allow user 150 to select a particular video feed that corresponds to the specific camera that is selected. Live video from the selected camera may be streamed to the user interface 200 of the virtual reality headset 154 in response to the selection of a particular graphical icon 226*a*, 226*b*, 226*c*, 226*d*, 226*e*, 226*f*, 226*g*, 226*h*, 226*i*, 226*j*, 226*k*.

Figure 3:
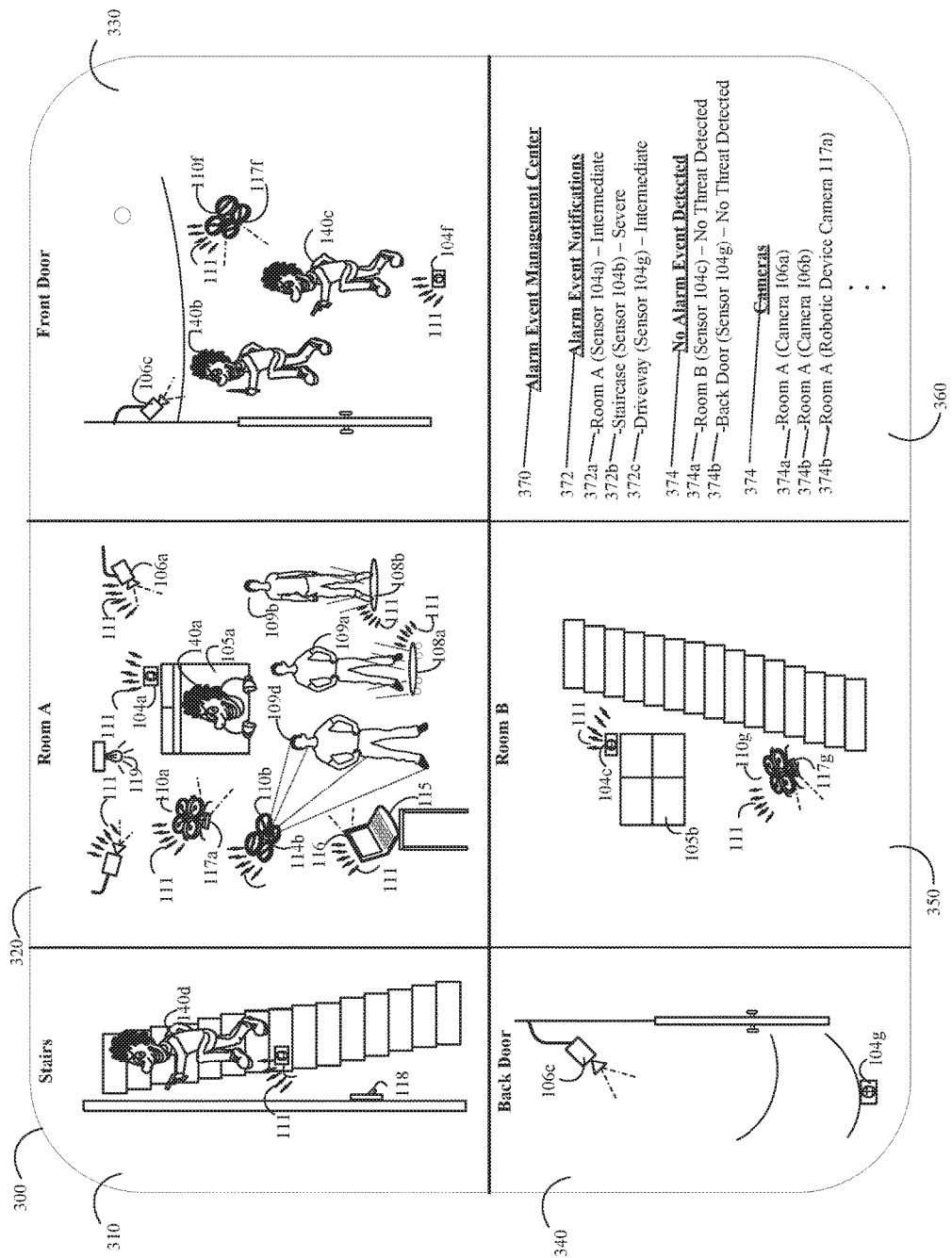
FIG. 3 is an example of a user interface that may be provided on the display of a virtual reality headset.

FIG. 3 is an example of a user interface 300 that may be provided on the display of a virtual reality headset 154.

The display of the virtual reality headset 154 may be configured as a split-screen that provides two or more live video feeds from two or more cameras 106*a*, 106*b*, . . . 106*f* associated with the security monitoring system 100. In the example of FIG. 3, different portions 310, 320, 330, 340, 350 of the user interface 300 may each be associated with a different live video feed. Alternatively, or in addition, at least a portion 360 of the display may be used to provide an alarm event management center 370 that is the same, or substantially similar to, the alarm event management center 220 described with reference to FIG. 2. The split screen-arrangement of the user interface 300 may provide the user with opportunity to investigate multiple locations of the property 101 that are each associated with an alarm event at the same time. Real-time video feeds of multiple different portions of the property 101 at the same time may assist a user 150 in planning an escape route to safety using the virtual reality headset 150.

Figure 4:
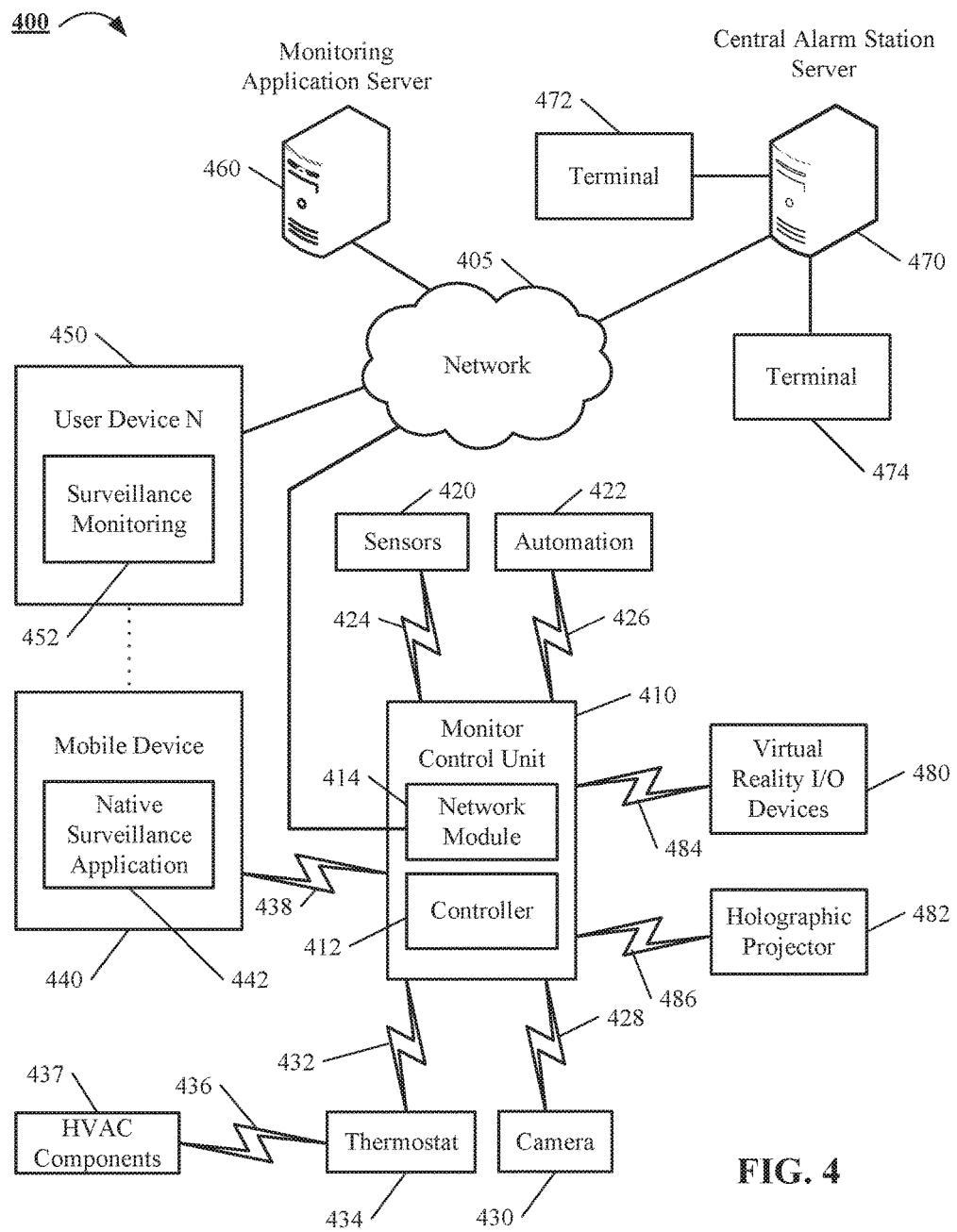
FIG. 4 is a block diagram of an example of a security monitoring system that may utilize virtual reality components and holograms.

FIG. 4 is a block diagram of an example of a security monitoring system 400 that may utilize virtual reality components and holograms.

A security system is augmented with virtual reality components. A virtual reality headset allows a user to explore sensed attributes of a property in virtual environment such that the user may be guided through an installation process and investigate an entirety of a home from an upstairs bedroom. In addition, hologram devices display holograms to enhance security by simulating human presence at a property in response to sensed events.

FIG. 4 illustrates an example of an electronic system 400 configured to provide surveillance and reporting. The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes one or more sensors or detectors. For example, the monitoring system may include multiple sensors 420. The sensors 420 may include a contact sensor, a motion sensor, a glass break sensor, or any other type of sensor included in an alarm system or security system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The monitoring system control unit 410 communicates with the module 422 and the camera 430 to perform surveillance or monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the monitoring system control unit 410. For instance, the module 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the monitoring system control unit 410 and can control the environmental (e.g., temperature) settings based on commands received from the monitoring system control unit 410.

In some implementations, the thermostat 434 is a dynamically programmable thermostat and can be integrated with the monitoring system control unit 410. For example, the dynamically programmable thermostat 434 can include the monitoring system control unit 410, e.g., as an internal component to the dynamically programmable thermostat 434. In addition, the monitoring system control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the monitoring system 400 for use in appropriate circumstances. For instance, a robotic vacuum cleaner device may be associated with the monitoring system 400 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, one or more projectors, and/or any type of output devices that allow the robotic devices to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices also may include a communication module that enables the robotic devices to communicate with the monitoring system control unit 410, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the monitoring system control unit 410. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 400. For instance, after completion of a monitoring operation or upon instruction by the monitoring system control unit 410, the robotic devices may be configured to automatically fly to and land on one of the charging stations. In this regard, the robotic devices may automatically maintain a fully charged battery in a state in which the robotic devices are ready for use by the monitoring system 400.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, the robotic device may always use changing station and the robotic device may always use changing station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the monitoring system control unit 410 references a stored table of the occupancy status of each charging station and instructs the robotic device to navigate to the nearest charging station that is unoccupied.

The system 400 further includes one or more virtual reality devices 480. The one or more virtual reality devices 480 may include any type of device allowing a user to immerse themselves in an environment that simulates a physical presence in one or more places. For instance, the one or more virtual reality devices 480 may include an input/output interface that allows a user to interact with the environment. The one or more virtual reality devices 480 may include output devices for providing sensory experience to the user, such as displays and speakers, and input devices for controlling one or more aspects of the experience based on user input, such as sensors and mechanical controls (e.g., buttons). For example, the one or more virtual reality devices 480 may include one or more wearable virtual reality head-mounted displays or headsets that may be worn by a user.

In some implementations, the one or more virtual reality devices 480 may simulate a physical presence in one or more places located within or around a property monitored by system 400. The one or more virtual reality devices 480 may provide a user with this experience by communicating with one or more components of system 400, such as sensors 420, module 422, and camera 430. For instance, a user may be able to view a live feed from camera 430 on a display of a virtual reality headset 480 worn by the user. In some implementations, the virtual reality headset 480 may monitor data from one or more accelerometers included in the virtual reality headset 480 and control panning, tilting, and/or zooming functions of camera 430 based on the user's head movements. This may allow for synchronous movement of camera 430 and the virtual reality headset 480 as positioned on the user's head, which may provide the user with the sensation of physical presence within the area monitored by camera 430. The virtual reality headset 480 may provide one or more control signals to camera 430 such that it tilts and pans with movement of the user's head. Zoom functions of camera 430 may be controlled in accordance with leaning movements of the user's head. In some implementations, the virtual reality headset 480 may determine a positioning of the user's head in three-dimensional space and control movement of camera 430 along each axis in accordance with Denavit-Hartenberg parameters.

In some implementations, the virtual reality headset 480 may control zoom functions of camera 430 based on the user's eye movements as detected by a camera integral with the virtual reality headset 480. In these implementations, the virtual reality headset 480 may determine that the user's eyes are focused on a particular portion of its display and/or object depicted in an image of its display and, in response, provide camera 430 with the control signals necessary to zoom into the user's area of interest. In these implementations, the virtual reality device 480 may "lock-onto" an object included in images provided by camera 430 in response to determining that the user has shown a relatively high degree of interest in the object. For instance, the virtual reality device 480 may identify one or more objects included in the images of camera 430 and track the user's gaze to determine if the user's eyes have consistently followed one of the identified objects. The virtual reality headset 480 may control camera 430 such that it continuously tracks these objects of interest.

In some examples, the one or more virtual reality devices 480 may simulate a physical navigation of one or more places located within or around the property monitored by system 400. For instance, if the property includes multiple cameras 430, a virtual reality headset 480 may seamlessly transition from feed-to-feed to simulate a traversal of an area monitored by a series of cameras 430. The user may be able to pan, tilt, and zoom each camera 430, as described above, as well as "walk" through the environment using one or more directional controls provided by head movement or tactile input, for example. That is, the virtual reality headset 480 may coordinate movements of cameras 430 and the feed provided for display for the user, based on the user's movements, directional input, and the location of each camera 430, to simulate movement and translate the user's vantage point. For example, this may allow a user to investigate a potential threat on their property from a remote location. When utilized in combination with the "lock-on" feature described above, a user may be able to follow a moving object located within or around the property.

In some implementations, the system 400 includes one or more three-dimensional scanners or one or more depth sensors. In these implementations, the one or more virtual reality devices 480 may be able to provide the user with a three-dimensional simulation of one or more areas of their property. When utilized in combination with the techniques described above in association with cameras 430, the user may be able to interact with three-dimensional renderings of objects on the property. In some implementations, data from the one or more three-dimensional scanners or one or more depth sensors may be utilized to model an environment, while data from one or more cameras 430 may be utilized to texturize the models generated. This may provide the user with a very realistic experience, allowing them to quickly and accurately identify and assess threats. In some implementations, the three-dimensional or depth information is gleaned from data provided by one or more sensors 420 and/or cameras 430.

The one or more virtual reality devices 480 may also provide virtual instructions to the user. For instance, the one or more virtual reality devices 480 may help guide the user through one or more installation processes associated with system 400. The one or more virtual reality devices 480 may communicate with a remotely-located technician, who will be able to receive a view of the user's home and provide instruction accordingly. For example, a technician may be able to see what the user is seeing and augment the display of their virtual reality headset 480 with one or more images to provide a demonstration for the user and assist with system configuration, installation, and/or maintenance.

The one or more virtual reality devices 480 may include one or more cameras, one or more proximity sensors, one or more gyroscopes, one or more accelerometers, one or more magnetometers, a global positioning system (GPS) unit, an altimeter, one or more sonar or laser sensors, one or more motion sensors, one or more accelerometers, one or more buttons or other mechanical controls, one or more microphones, and/or any other types of sensors. Furthermore, the one or more virtual reality devices 480 may receive input from any of sensors 420.

The system 400 further includes one or more holographic projectors 482. The one or more holographic projectors 482 may include any device capable of projecting an image that appears three-dimensional to a viewer. This may include projection systems that modify a projected image as the position and orientation of a viewer of the system changes, such that an object included in the projected image consistently appears three-dimensional from the perspective of the viewer. The one or more holographic projectors 482 may be configured to project images into one or more nearby spaces within or around the property. For example, one or more holographic projectors 482 may be utilized to project holographic images as deterrents. In these examples, the one or more holographic projectors 482 may project images of various objects in response to an alarm event to create the appearance that the property of system 400 is occupied. For example, in response to an alarm event detecting an intruder using one or more of sensors 420, the system 400 may command a holographic projector 482 to project an image of a person onto a wall of an upstairs bedroom. In another example, the holographic projector 482 may project an image of a ferocious dog onto an area adjacent to a doorway. The one or more holographic projectors 482 may operate in conjunction with cameras 430 in order to track a potential threat (e.g., intruder, burglar, etc.) and tailor renderings of holographic projections according to their estimated vantage point. In some implementations, the holographic images produced by one or more holographic projectors 482 may be animated.

A user may be able to control operation of the one or more holographic projectors 482. For instance, the user may be able to select images, locations of projections, and the various criteria associated with triggering projections. In some implementations, the one or more holographic projectors 482 may operate in coordination with module 422 or be controlled by module 422. For instance, module 422 may control operation of one or more holographic projectors 482 and one or more lighting systems, to create a greater sense of occupancy. In some examples, the module 422 may activate a lighting system as a holographic projector 482 projects images of a person walking into the room. In some implementations, a user may be able to control one or more holographic projectors 482, in a manner similar to that which has been described above, using one or more virtual reality devices 480.

In some implementations, the one or more virtual reality devices 480 may provide the user with an "augmented reality" by which they can visualize a configuration of images produced by one or more holographic projectors 482. For example, as a user wearing a virtual reality headset 480 walks about their property, the virtual reality headset may augment their environment with renderings of the holographic images that the one or more holographic projectors 482 may be configured to project. This may give the user an opportunity to preview a holographic projection configuration and make modifications. In some implementations, the user may be able to make all of these modifications with the virtual reality device 480. The user may also be able to utilize one or more virtual reality devices 480 to configure and/or activate holographic projections on-the-fly. For example, while following an intruder around a property using the virtual reality headset 480 in a manner similar to that which has been described above, the user may be able to decide to place a holographic image of a person in an area that will soon be visible to the intruder. In this example, a video feed provided by one or more cameras 430 and viewed by the user through the virtual reality headset 480 may be augmented with indicia to allow the user to configure a holographic projection.

In some implementations, a wearable virtual reality device 480, such as a headset, may help train the holographic projectors 482, or a system for controlling the holographic projectors 482 (e.g., module 422). For example, sensor data reflective of a user's movements may be monitored as the user walks around their house and later used to create more realistic renderings for the one or more holographic projectors 482 to produce. For instance, the holographic projectors 482 may be able to project images of people walking through the home in a manner similar to that of the user. In some implementations, the one or more holographic projectors 482 may be mounted on a robot device, such as a drone. In these implementations, the one or more robot devices may move or fly around a property and project holographic images as needed.

The sensors 420, the module 422, the camera 430, the thermostat 434, the virtual reality devices 480, and the holographic projectors 482 communicate with the controller 412 over communication links 424, 426, 428, 432, 484, and 486. The communication links 424, 426, 428, 432, 484, and 486 may be a wired or wireless data pathway configured to transmit signals from the sensors 420, the module 422, the camera 430, the thermostat 434, the virtual reality devices 480, and the holographic projectors 482 to the controller 412. The sensors 420, the module 422, the camera 430, the thermostat 434, the virtual reality devices 480, and the holographic projectors 482 may continuously transmit sensed values to the controller 412, periodically transmit sensed values to the controller 412, or transmit sensed values to the controller 412 in response to a change in a sensed value.

The communication links 424, 426, 428, 432, 484, and 486 may include a local network. The sensors 420, the module 422, the camera 430, the thermostat 434, the virtual reality devices 480, and the holographic projectors 482 and the controller 412 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 110. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 460 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410 or the one or more user devices 440, 450.

The central alarm station server 470 is an electronic device configured to provide alarm monitoring service by exchanging communications with the monitoring system control unit 410, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450 and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a noncellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various local wireless protocols such as wifi, Bluetooth, zwave, zigbee, HomePlug (ethernet over powerline), or wired protocols such as Ethernet and USB, to connect the one or more user devices 440, 450 to local security and automation equipment. The one or more user devices 440, 450 may connect locally to the monitoring system and its sensors and other devices. The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 410, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In some implementations, the one or more user devices 440, 450 are used in conjunction with only local sensors and/or local devices in a house. In these implementations, the system 400 only includes the one or more user devices 440, 450, the sensors 420, the module 422, the camera 430, and the robotic devices. The one or more user devices 440, 450 receive data directly from the sensors 420, the module 422, the camera 430, and the robotic devices and sends data directly to the sensors 420, the module 422, the camera 430, and the robotic devices. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices are configured to communicate sensor and image data to the one or more user devices 440, 450 over network 405 (e.g., the Internet, cellular network, etc.). In yet another implementation, the sensors 420, the module 422, the camera 430, the thermostat 434, and the robotic devices (or a component, such as a bridge/router) are intelligent enough to change the communication pathway from a direct local pathway when the one or more user devices 440, 450 are in close physical proximity to the sensors 420, the module 422, the camera 430, the thermostat 434, and the robotic devices to a pathway over network 405 when the one or more user devices 440, 450 are farther from the sensors 420, the module 422, the camera 430, the thermostat 434, and the robotic devices. In some examples, the system leverages GPS information from the one or more user devices 440, 450 to determine whether the one or more user devices 440, 450 are close enough to the sensors 420, the module 422, the camera 430, the thermostat 434, and the robotic devices to use the direct local pathway or whether the one or more user devices 440, 450 are far enough from the sensors 420, the module 422, the camera 430, the thermostat 434, and the robotic devices that the pathway over network 405 is required. In other examples, the system leverages status communications (e.g., pinging) between the one or more user devices 440, 450 and the sensors 420, the module 422, the camera 430, the thermostat 434, and the robotic devices to determine whether communication using the direct local pathway is possible. If communication using the direct local pathway is possible, the one or more user devices 440, 450 communicate with the sensors 420, the module 422, the camera 430, the thermostat 434, and the robotic devices using the direct local pathway. If communication using the direct local pathway is not possible, the one or more user devices 440, 450 communicate with the sensors 420, the module 422, the camera 430, the thermostat 434, and the robotic devices using the pathway over network 405.

In some implementations, the system 400 provides end users with access to images captured by the camera 430 to aid in decision making. The system 400 may transmit the images captured by the camera 430 over a wireless WAN network to the user devices 440, 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

Figure 5:
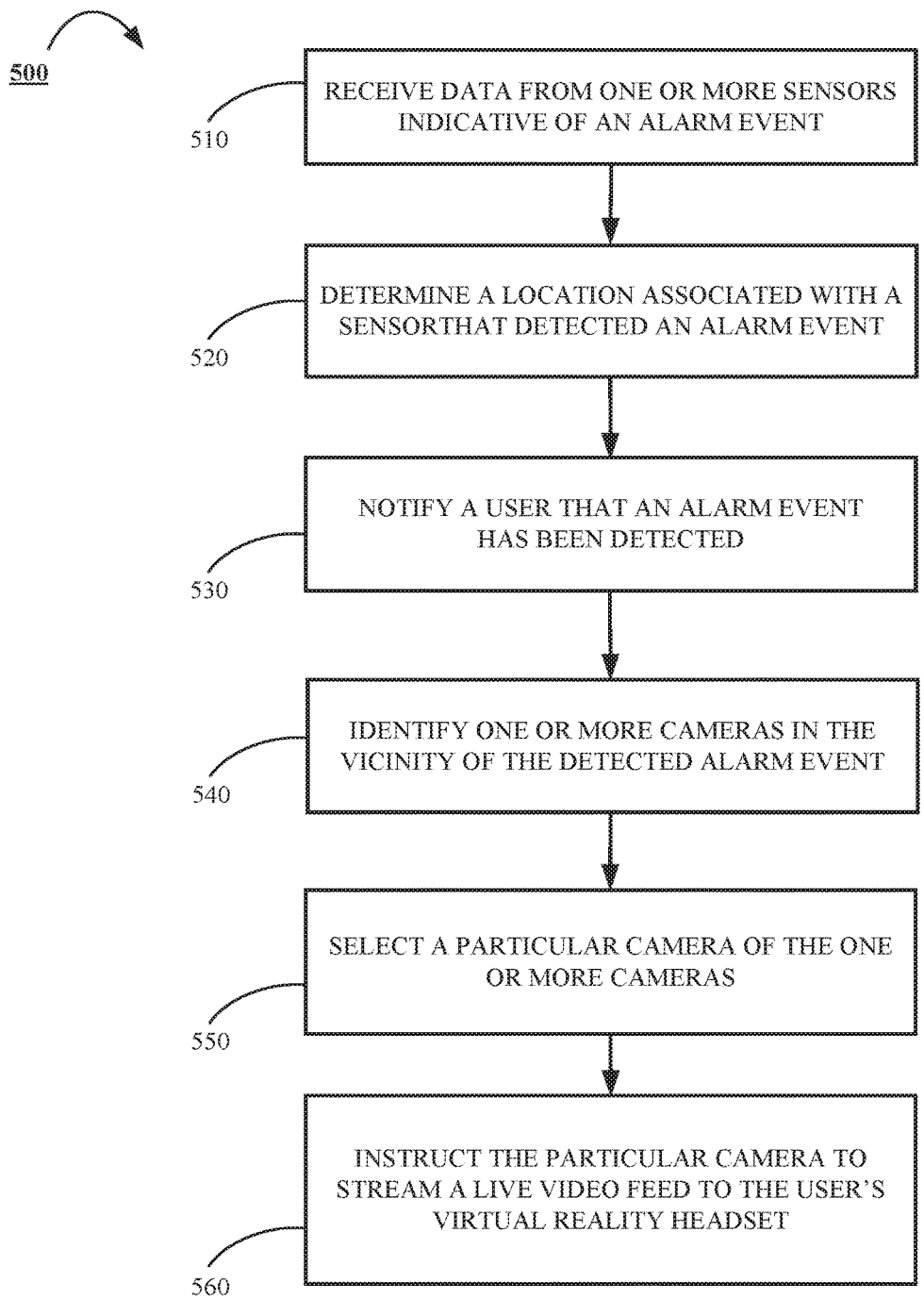
FIG. 5 is a flowchart of an example of a process for using a virtual reality headset to investigate an alarm event that was detected by the security monitoring system.

FIG. 5 is a flowchart of an example of a process 500 for using a virtual reality headset 154 to investigate an alarm event that was detected by the security monitoring system 400.

The process 500 may begin at 510 when a monitoring system control unit 410 receives data from one or more sensors 420 that may be indicative of an alarm event. The data may include an alarm event notification that comprises, for example, an identifier of the sensor 420 that broadcasted the alarm event notification. In some implementations, the alarm event notification may also include the location of the sensor 420. The alarm event notification may also include information regarding the severity of the alarm event. For instance, a sensor 420 may be able to measure the force with which a window was broken. Alternatively, or in addition, for example, the sensor 420 may be able to determine the number of objects moving in the vicinity of the sensor 420. The alarm event notification may include raw data that may be indicative of the severity of the alarm event, or a scaled score on a rating scale (e.g., 1 through 10) that may be indicative of the severity of the alarm event.

The monitoring system control unit 410 may analyze the data received at 510. For instance, the monitoring system control unit 410 may analyze the data received at 510 to determine 520 the location associated with the sensor 420 that detected the alarm event. The monitoring system control unit 410 may determine the location of the sensor 420 by, for example, obtaining the location of the sensor 420 from the data received at 510. Alternatively, the monitoring system control unit 410 may access stored sensor information that the monitor control unit 410, or other component of system 400, maintains. The stored sensor information may include a table of sensor 420 locations organized by sensor identifiers. In some implementations, the monitoring system control unit 410 may be able to map a received sensor identifier to a sensor location using the data maintained in the table of sensor locations. The table of sensor 420 locations may be populated at the time each sensor 420 is installed. The table of sensor 420 locations may also be updated in the event that a particular sensor 420 is moved, replaced, or the like. In some implementations, the sensor information may be stored, or otherwise maintained, in a database that is remote to the monitoring system control unit 420, but still accessible by the monitoring system control unit 420 via one or more networks 405.

The monitoring system control unit 410 may notify 530 a user that an alarm event has been detected. The user notification may be transmitted to the user's mobile device 450. The user's mobile device 450 may include, for example, a mobile phone, smart phone, tablet, smart watch, laptop, or the like. The user notification may inform the user that an alarm event has been detected. Alternatively, or in addition, the user notification may include the location associated with the detected alarm event. Alternatively, or in addition, the user notification may instruct the user to migrate to a room in the property 101 that is safe. Alternatively, or in addition, the user notification may instruct the user to obtain a virtual reality headset 480 that the user can utilize to investigate the alarm event. However, the monitoring system control unit 410 need not transmit a notification to a user's mobile device in order to notify the user of an alarm event. For instance, the monitoring system control unit 410 may initiate the output of one or more visual or audio messages that may be communicated throughout a property 101 such as, for example, flashing lights, sirens, audio messages warning of an intruder, or the like. In response to receiving a user notification, and facing potentially dangerous circumstances, the user may migrate to a room in the property 101 that is safe and put on virtual reality headset 480.

The monitoring system control unit 410 may identify 540 one or more cameras that are associated with an alarm event. For instance, the monitoring system control unit 410 may determine the set of one or more cameras 430 that may be located in the vicinity of the alarm event. Referencing the example of FIG. 1, the set of one or more cameras available for a Room A may include camera 106*a*, 106*b*, 117*a*, and/or 116. The monitoring system control unit 410 may store a table that indicates the locations of each camera in a property 101. Alternatively, or in addition, the monitoring system control unit 410 may be able to access a table that indicates the locations of each camera in a property 101. The monitoring system control unit 410 may use the location associated with the detected alarm event to search the table indicating camera locations in order to identify the set of one or more cameras that are located in the same vicinity as the detected alarm event.

The monitoring system control unit 410 may then select 550 a particular camera from the set of one or more cameras. The monitoring system control unit 410 may select the particular camera based on its proximity to the sensor 420 that broadcast the alarm event notification. Alternatively, or in addition, the monitoring system control unit 410 may select the particular camera 430 based on a determination that the particular camera 430 is currently sensing movement. Alternatively, or in addition, the particular camera 430 may be selected based on the camera's capabilities. For instance, the particular camera may be selected because the particular camera supports the streaming of high-definition video to the virtual reality headset 480. Alternatively, or in addition, a particular camera may be selected because the camera supports thermal vision, night vision, and/or the like. Alternatively, or in addition, a particular camera may be selected because the camera is mobile (e.g., a camera mounted to a robotic device). Other ways of selecting a particular camera from a set of cameras may also fall within the scope of the present disclosure.

The table storing information related to each camera's location, or another table, may store information related to each camera's capabilities that may be accessed, and searched, in order to select a particular camera in response to a detected alarm event. Information contained within, or obtained after the receipt of, the alarm event notification may be used to select a particular camera. For instance, information such as the location of the sensor, information associated with the sensor's location (e.g., whether the sensor's location has power), or the like may be used to select a particular camera from the set of one or more cameras.

The monitoring system control unit 410 may transmit 560 one or more instructions to the particular camera 430 that was selected from the set of one or more cameras. The one or more instructions may command the particular camera 430 to stream a live video feed to the user's virtual reality headset 480. Alternatively, or in addition, the monitoring system control unit 410 may transmit one or more instructions to the virtual reality headset 480 that command the virtual reality headset 480 to begin streaming video from the particular camera that was identified by the monitoring system control unit 410. The user of the virtual reality headset 480 may view the video feed via a user interface provided by the display of the virtual reality headset 480. The user interface provided by the display of the virtual reality headset 480 may include one or more of the features of user interfaces 200, 300 described above in the examples of FIGS. 2 and 3, respectively.

The one or more instructions transmitted by the monitoring system control unit 410 may also include an instruction to command the particular camera 430 to sync with the virtual reality headset 480. Synching a particular camera 430 to the virtual reality headset 480 may allow the user of the virtual reality headset 480 to remotely control the camera 430. For instance, in some implementations, the virtual reality headset 480 may include circuitry to allow for synchronous movement of camera 430 and the virtual reality headset 480. For instance, movements of the user's head, while wearing the virtual reality headset 480, may also move the synced camera 430 a proportional amount. Alternatively, or in addition, zoom functions of camera 430 may be controlled in accordance with leaning movements of the user's head. In the same, or other, implementations, syncing the particular camera 430 with the virtual reality headset 480 may also enable a user to control zoom functions of camera 430 based on the user's eye movements as detected by a camera integral with the virtual reality headset 480. In other implementations, the user of the virtual reality headset may submit a request to initiate syncing of the user's virtual reality headset 480 with one or more cameras 430. Such a user request may be processed, and executed by, the central monitoring control unit 410 and/or one or more cameras 430.

Figure 6:
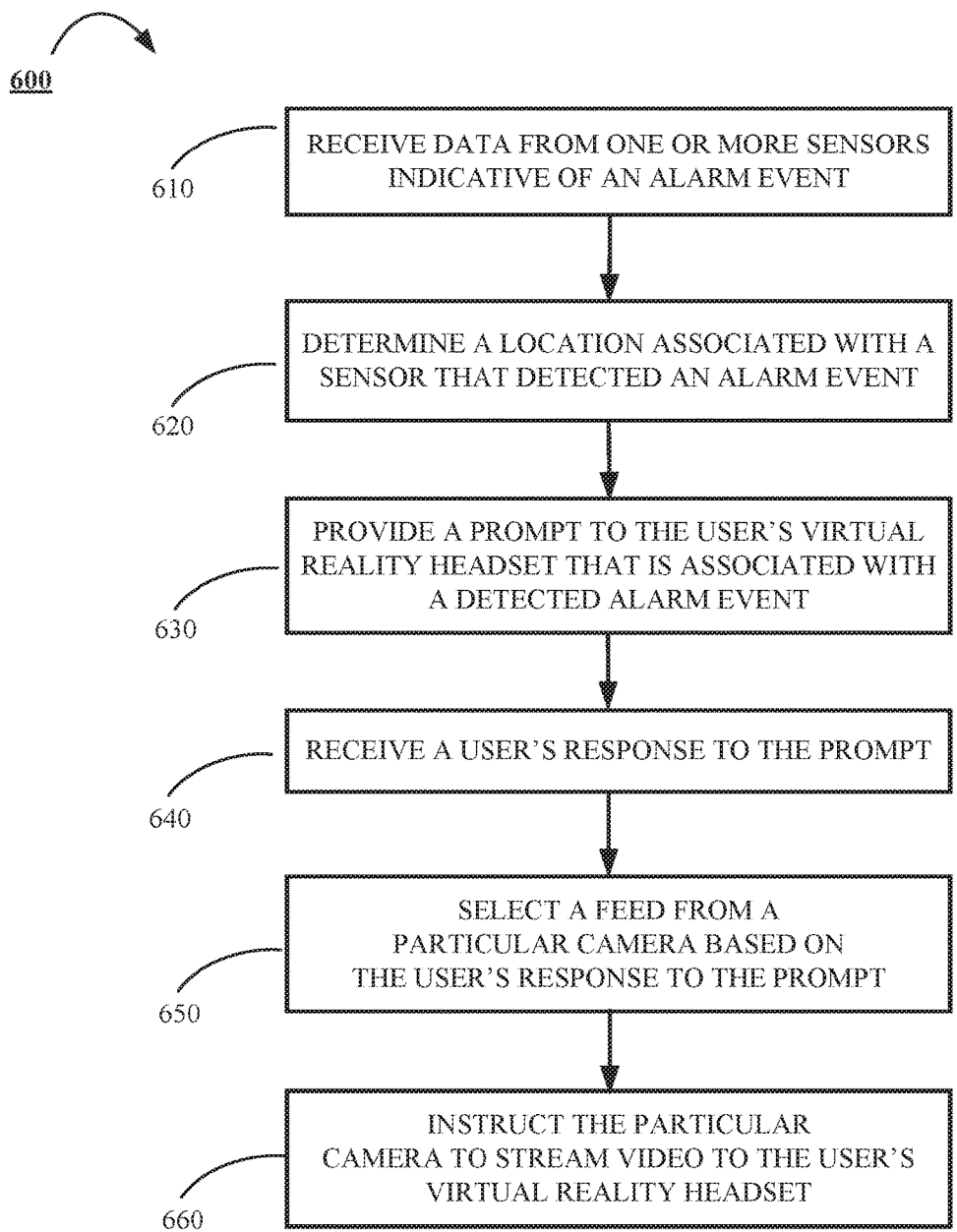
FIG. 6 is a flowchart of an example of a process for receiving alarm event notifications via a virtual reality headset from the security monitoring system.

FIG. 6 is a flowchart of an example of a process 600 for receiving alarm event notifications via a virtual reality headset from the security monitoring system 400.

The process 600 may begin at 610 when a monitoring system control unit 410 receives data from one or more sensors 420 that may be indicative of an alarm event. The received data may include, for example, an alarm event notification, as previously described herein. At 620, the monitoring system control unit 410 may determine the location associated with a sensor 420 that detected the alarm event.

The process may continue at 630 with the monitoring system control unit 410 providing prompt for output on the display of a user's virtual reality headset 480. The prompt may be associated with a detected alarm event. For instance, in one implementation, while a user is investigating a previously detected alarm event using the virtual reality headset 480, the virtual reality headset 480 may receive, and display (or otherwise output), a prompt regarding a different alarm event in another aspect of property 101. The prompt may include one or more selectable icons and/or request one or more types of responses from the user. The one or more selectable icons may be similar to, or different than, the graphical icons displayed in the alarm event management center shown in the examples of FIG. 2 and/or FIG. 3. Alternatively, or in addition, the prompt may be an audio prompt output to the user via one or more speakers of the virtual reality headset 480.

The user may provide an input in response to the prompt. For instance, the user may decide to select one or more of the selectable icons displayed in association with the prompt. Selecting a particular selectable icon may change the display on the user's virtual reality headset 480 to a different live video feed. The different live video feed may be from a camera located at a portion of property 101 that is associated with the alarm event identified in the prompt. Alternatively, or in addition, the user may provide an input that requests that the different live video feed may be displayed in a split screen using the display of the user's virtual reality headset 480. Alternatively, or in addition, the user may be able provide an input that forwards the different video feed to a law enforcement agency, central operator, or the like. Alternatively, or in addition, the user may provide a different input that provides an indication to ignore the prompt. The user's input may be in the form of a gaze at a particular icon, an uttered voice command, an input on a user device 450, or the like.

The prompt may provide one or more indications regarding the severity of the threat. For instance, the prompt may indicate whether the different alarm event is a negligible threat, intermediate threat, or a severe threat. The prompt may be color coded and/or animated. For instance, a negligible threat may be provided in green text on the display of the virtual reality headset 480. Other threats, such as, for example, a severe threat may be provided in red flashing text that may be more likely to catch a user's attention. Other types of formatting may be used to stress the severity of a particular prompt that may be displayed on the user's virtual reality headset 480.

The monitoring system control unit 410 may receive 640 data that is indicative of the user's input in response to the prompt. The monitoring control unit 410 may process the user's input in order to identify a particular camera that is associated with the prompt. In one implementation, the user's input in response to the prompt may identify a particular camera of the multiple cameras. Alternatively, or in addition, the monitoring system control unit 410 may map the data that is indicative of the user's response to the prompt to a particular camera of the one or more cameras associated with the particular property 101. Alternatively, or in addition, the monitoring system control unit 410 may select a camera in the same, or similar, way as described with reference to FIG. 5, 550 above based on the user's response to the prompt.

The monitoring system control unit 410 may transmit 660 one or more instructions to the particular camera that commands the camera to stream a live video stream to the user's virtual reality headset 480. Alternatively, or in addition, the monitoring system control unit 410 may transmit one or more instructions to the virtual reality headset 480 that commands the virtual reality headset 480 to begin streaming video from the particular camera that was identified by the monitoring system control unit 410.

The process 600 may be described by way of example. For instance, a user may be monitoring the live feed from camera 106*a* that is associated with an alarm event in Room A. While viewing the feed from camera 106*a*, monitoring system control unit 410 may transmit data indicative of a prompt that is received by the virtual reality headset 480. The prompt may include a selectable icon indicating that that an alarm event is occurring in the Driveway, and the selectable icon may be output via the display of the virtual reality headset 480. In one instance, the user may provide an input that selects the selectable icon indicating that there is an alarm event occurring in the Driveway. The monitoring system control unit 410 may receive data indicative of the user's selection, map the data indicative of the user's selection to camera 106*c*, and then instruct camera 106*c* to begin streaming a live video feed to the user's virtual reality headset 154. Alternatively, or in addition, the central system monitoring unit may instruct the virtual reality headset 154 to request a live video feed from the camera 106*c*.

Figure 7:
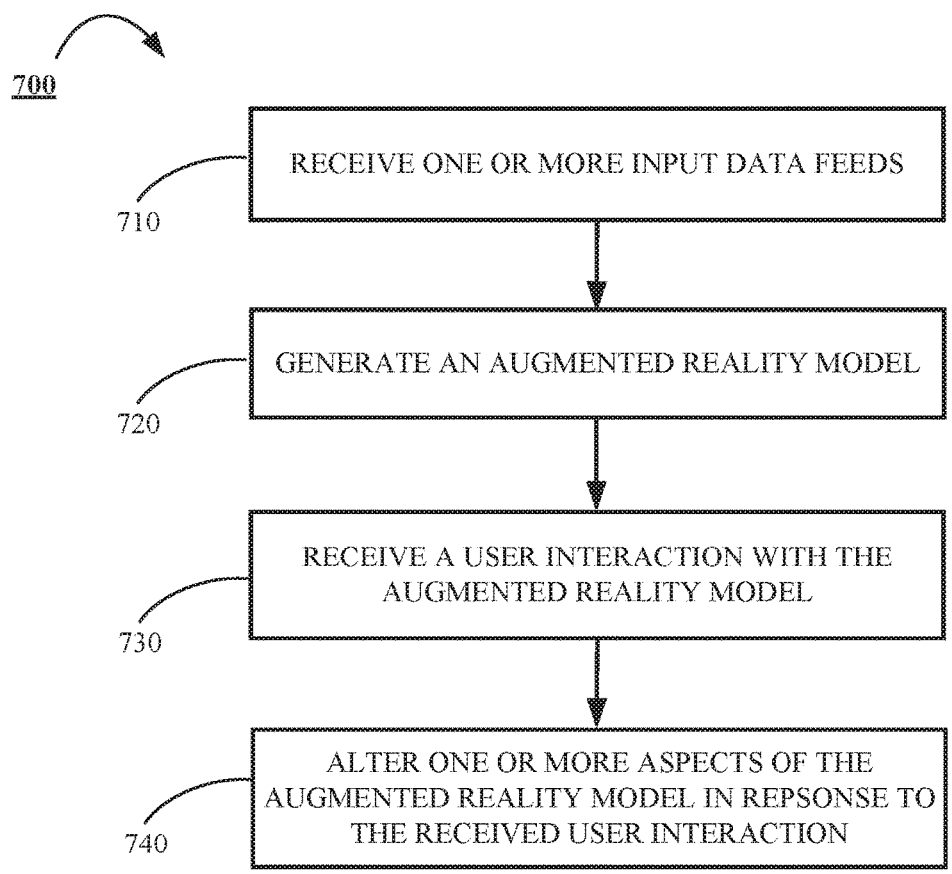
FIG. 7. is a flowchart of an example of a process for using a virtual reality headset to interact with aspects of a property that is monitored by the security monitoring system.

FIG. 7. is a flowchart of an example of a process 700 for using a virtual reality headset 480 to interact with aspects of a property that is monitored by the security monitoring system 400.

In one aspect, a server such as the monitoring application server, a dedicated three dimensional modeling server, or the like may be used to implement process 700 to create an interactive augmented reality environment. The interactive augmented reality environment may allow a user to interact with one or more aspects of a virtual model of a property such as, for example a property 101. In some instances, such interactions may result in a modification to one or more features of the real world property 101 (e.g., changes in lighting, positioning of holograms, or the like).

The process 700 may begin with the server receiving one or more input data feeds associated with a property 101. The input data feeds may include one or more image and/or video feeds. The input data feeds may be provided by multiple cameras, from multiple angles. The use of multiple cameras may provide the advantages such as, for example, a second camera capturing a feature of property 101 that is within the second camera's line of sight even though the feature may be outside of the line of sight of a first camera. The input data feed may be provided by one or more cameras 430 that are associated with a property 101, one or more three-dimensional scanners, one or more depth sensors, or the like.

The server may generate 720 an interactive augmented reality model based on the received input data feeds. For instance, the server may use one or more input data feeds from the three-dimensional scanners and/or the depth sensors in order to generate a model that captures the particular features of a particular portion (e.g., Room A) of property 101. Alternatively, or in addition, the server may use high-definition, or greater, resolution images and/or video captured by one or more cameras 430 in order to texturize the generated model.

A user may interact with the generated augmented reality model. Such interactions may allow a user to safely investigate portions of a property 101 from a safe place during an alarm event. Such an interactive augmented reality model differs from a conventional security system that may simply utilize one or more cameras because such conventional systems may include multiple blind spots. Such blind spots may create danger for the user who looks at the video feed of the camera, thinks the room is clear, and then the user migrates to the room only to come face-to-face with an intruder who was hiding in the camera's blind spot. The subject matter of the present disclosure, however, may provide an opportunity for a user to investigate a room of a property that is associated with an alarm event while eliminating the problem posed by blind spots.

By way of example, the server may instruct one or more cameras 106a, 106b, 117a, 116 to capture live video and/or image feeds of Room A in property 101. Alternatively, or in addition, the server may instruct one or more three dimensional scanners and/or depth scanners in order to capture detailed scans of Room A from multiple different angles. In one implementation, the cameras 106a, 106b, 117a, 116, the three dimensional scanners, and/or the depth scanners may be configured at the time of installation so that they can capture multiple aspects of Room A from multiple different angles, while eliminating, or substantially minimizing, the existence of blind spots. The images, videos, and/or scans of Room A obtained using the cameras and/or scanners may be transmitted to the server, and used to generate an interactive augmented reality model.

Once generated, a user may view the interactive augmented reality model via the display of the virtual reality headset 480. Using the virtual reality headset 480, and one or more articles of clothing equipped with sensors that enable the user's movements to be detected by the virtual reality model, the user may interact with the interactive augmented virtual reality model. For instance, by way of example, the user may interact with an interactive augmented reality model of Room A by "grabbing" a generated model of table 120, and "moving" the table aside to see if an intruder such as, for example, a burglar is hiding underneath the table. The server may receive 730 data indicative of the user's attempt to "grab," and "move" the table 120 based on readings of movement associated with sensors on the user's clothing. In response to the data indicative of the user's attempt to "grab," and "move" the table 120 the server may execute instructions that alter the interactive augmented reality model to be responsive to the user's input to "grab" and "move" the table 120, and reveal a rendering of the space of Room A that exists underneath table 120. Thus, the interactive augmented reality environment may allow a user to investigate aspects of the user's property during what may be a hostile home invasion by one or more intruders from the safety of a user's bedroom, or other safe room, using the virtual reality headset 480. Though a user may interact with, and "move," the table 120 in the augmented reality model, the physical table 120 in the actual Room A is not moved.

Though the user's interaction with the table 120 in the augmented reality model is solely an interaction with a virtual table, and not the real world table 120, the interaction provides a real world benefit of examining a rendering of what is underneath the table based on one or more images captured by the cameras and/or scanners used to generate the augmented reality model. However, other interactions with the augmented reality model may provide for changes in certain properties of real world Room A. For instance, the augmented reality model may be configured to transmit commands to control modules integrated with security monitoring system 100 based on user interactions with the augmented reality model. Such control modules may be able to toggle lighting elements, audio systems, or the like based on user interactions with light switches, audio systems, or the like in the augmented reality model. A user may also use the augmented reality model to position the location of a particular hologram. Once positioned, the server providing the augmented reality model may capture coordinates associated with the hologram's location, and transmit the coordinates to a corresponding holographic projector. The holographic projector may then generate holograms in the designated area, when instructed by a monitoring system control unit 410 to display a hologram.

Figure 8:
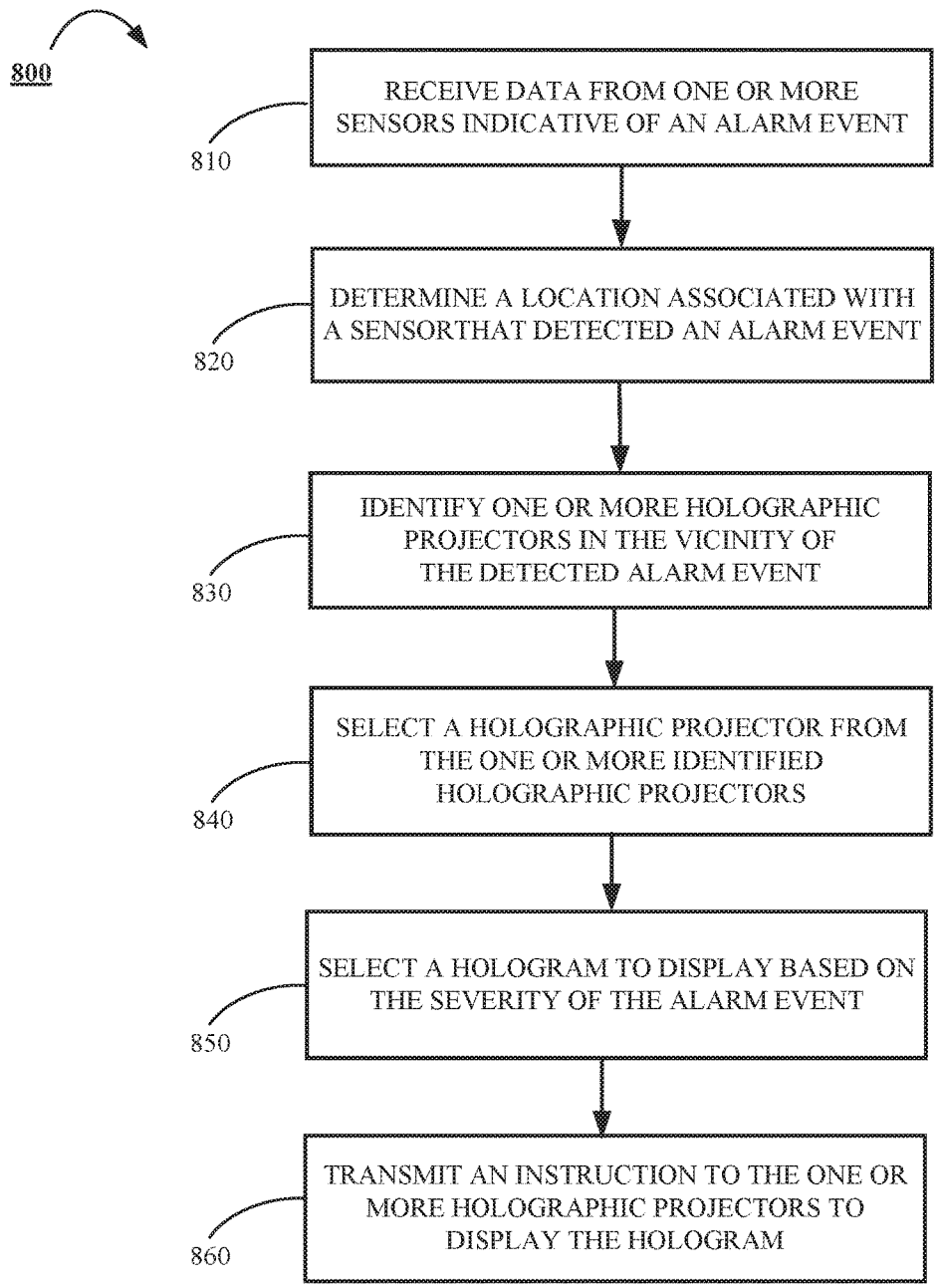
FIG. 8 is a flowchart of an example of a process for using a hologram as a component of the security monitoring system.

FIG. 8 is a flowchart of an example of a process for using a hologram as a component of the security monitoring system 400.

The process 800 may begin at 810 when a monitoring system control unit 410 receives data from one or more sensors 420 that may be indicative of an alarm event. The received data may include, for example, an alarm event notification, as previously described herein. At 820, the monitoring system control unit 410 may determine the location associated with a sensor 420 that detected the alarm event.

The monitoring system control unit 410 may identify 830 one or more holographic projectors 482 that may be associated with the detected alarm event. For instance, the monitoring system control unit 410 may determine the set of one or more holographic projectors 482 that may be located in the vicinity of the alarm event. Referencing the example of FIG. 1, the set of one or more holographic projectors available for a Room A may include holographic projectors 108a, 108b, and/or 114b. The monitoring system control unit 410 may store a table that indicates the locations of each holographic projector in a property 101. Alternatively, or in addition, the monitoring system control unit 410 may be able to access a table that indicates the locations of each holographic projector in a property 101. The monitoring system control unit 410 may use the location associated with the detected alarm event to search the table indicating holographic projector locations in order to identify the set of one or more holographic projectors that are located in the same vicinity as the detected alarm event.

The monitoring system control unit 410 may then select 840 one or more particular holographic projectors 482 from the set of one or more holographic projectors 482. The monitoring system control unit 410 may select the particular one or more holographic projectors 482 based on each holographic projector's proximity to the sensor 420 that broadcast the alarm event notification. Alternatively, or in addition, the particular camera 430 may be selected based on the capabilities of each respective holographic projector. For instance, a particular holographic projector 482 may be selected because the particular holographic projector 482 is mobile. Such a holographic projector 482 may be selected in response to an intermediate threat alarm event. A mobile holographic projector 482 may be selected in response to an intermediate threat alarm event in order to organically introduce a hologram into particular room. Alternatively, or in addition, a particular hologram projector 482 may be selected because the holographic projector 482 includes a speaker. Such a holographic projector 482 be selected in response to a severe threat alarm event because an intruder may be present in the property 101, and one or more audible sounds may be needed to be output to add effect and/or context to more threatening hologram. It should be considered that mobile holographic projectors may also be selected in response to severe threat alarm events and holographic projectors with speakers may also be selected in response to intermediate alarm events, as necessary. The monitoring system control unit 410, or other component of security system 400, may store holographic projector capability information that the monitoring system control unit 410 may analyze when determining the appropriate particular holographic projector to select. Other ways of selecting a particular holographic projector 482 from a set of available holographic projectors 482 may also fall with the scope of the present disclosure.

The monitoring system control unit 410 may select a particular hologram to be displayed by the selected holographic projector(s) 482 from a set of available holograms. In one implementation, the monitoring system control unit 410 may select a particular hologram based on the severity of the alarm event. For instance, a broadcasted alarm event notification may include data regarding the severity of the alarm event. This may include, for example, data indicating the amount of force with which a window was broken, as measured by a sensor 420. Alternatively, or in addition, for example, the broadcast alarm event notification may include data indicating the number of objects moving in the vicinity of a particular sensor 420, as measured by the sensor 420. The alarm event notification may include raw data that may be indicative of the severity of the alarm event, or a scaled score on a rating scale (e.g., 1 through 10) that may be indicative of the severity of the alarm event.

The monitoring system control unit 410 may determine whether the severity of an alarm event exceeds a predetermined threshold. For instance, the monitor control unit 410 may determine, based on the force applied to a window, that the window was merely jostled, and not broken. In such an instance, the alarm event may be treated as an intermediate threat, and the monitoring system control unit 410 may select the hologram of a person to be displayed by the identified holographic projector 482. Alternatively, or in addition, a response to an intermediate threat may include a hologram of person walking into the room associated with an alarm event from another room of the property 101.

Other alarm events may be determined to be more severe. For instance, an alarm event may be categorized as severe when one or more sensors 420 identifies an intruder within a property 101. In such instances, the monitoring system control unit 410 may select a more threatening hologram for display via the selected holographic projector(s) 482. More threatening holograms may include, for example, a vicious, barking dog, a man with a pump action shotgun, or the like. Such holograms may also be accompanied by audio signals such as, for example, a dog barking, a distinct sound of a shotgun round being moved into the barrel of a pump action shot gun, or the like.

The monitoring system control unit 410 may transmit one or more instructions to the selected holographic projector(s) 482 that the command the selected holographic projector(s) to display the selected hologram(s). In one implementation, the monitoring system control unit 410 may transmit instructions to display holograms to two or more holographic projectors 482. Such instructions may be associated with a timing sequence that triggers the display of a first hologram prior to a second hologram. For instance, in response to an intermediate alarm event, the monitoring system control unit 410 may transmit instructions to a set of two holographic projectors. In response to the received instruction, the first mobile holographic projector may display a hologram of a woman walking into a room. Then, after a predetermined time expires, a second mobile holographic projector may display a hologram of a man walking into the room and talking to the woman. Such organic behavior of the displayed holograms may help to create the illusion that a particular property 101 is occupied. Such an illusion may frighten away an intruder before an intruder completes the home invasion.

It is also contemplated that moving holograms may be displayed without a mobile holographic projector. For instance, one or more holographic projectors may be mounted on a swivel on a surface of property 101 such as, a floor, wall, and/or ceiling. The one or more holographic projectors may project the hologram, while rotating about the swivel, in order to produce a moving hologram. Other types of mounts may be used by a holographic projector in order to provide the necessary type of projector movement necessary to create the display of a moving hologram.

Figure 9:
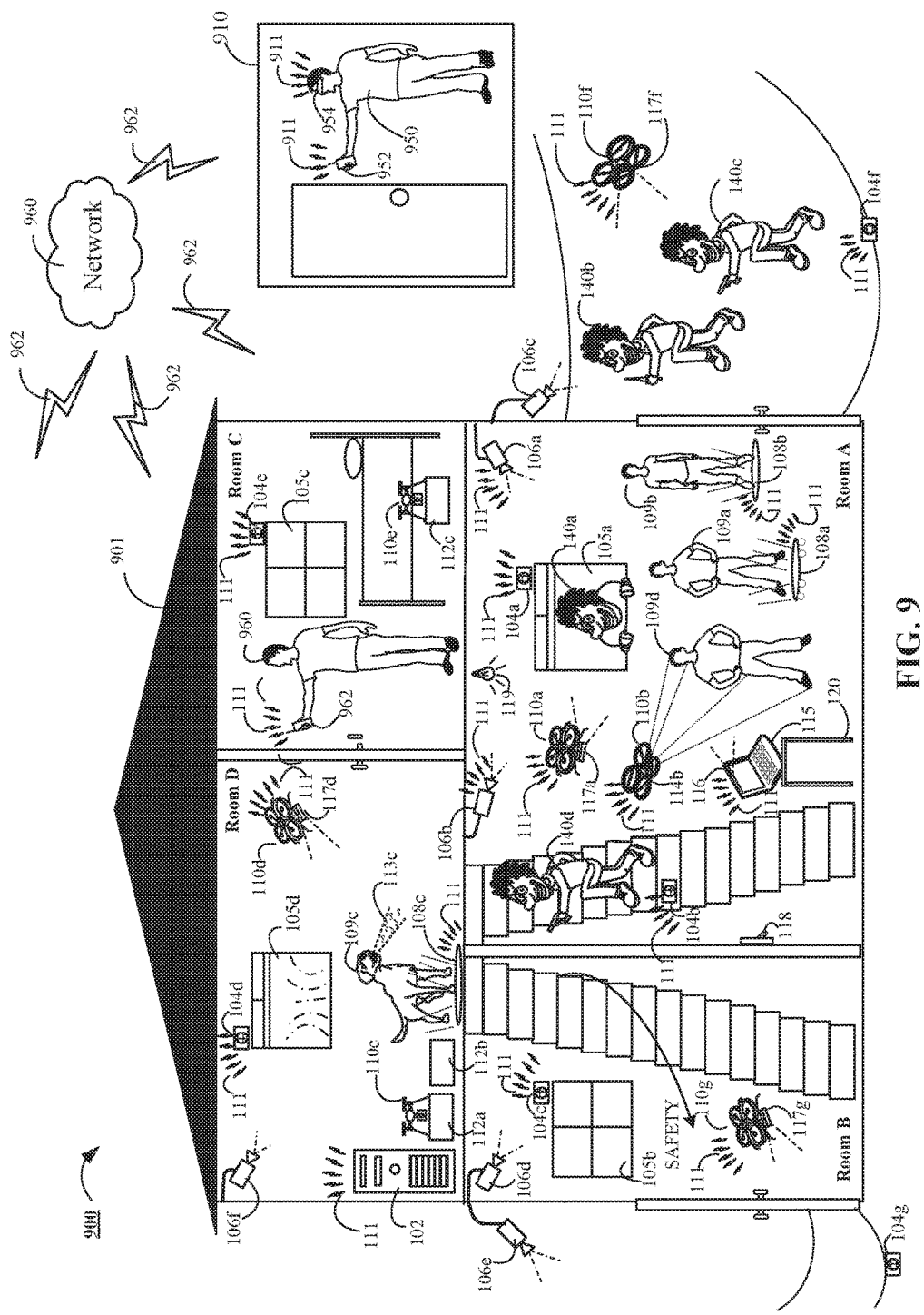
FIG. 9 is a contextual diagram of an example of a remote user interacting with the security monitoring system using a virtual reality headset.

FIG. 9 is a contextual diagram of an example of a remote user 950 interacting with the security monitoring system using a virtual reality headset 954.

The security monitoring system 900 may be used to monitor, surveil, and protect property 901 in the same, or substantially similar, manner as the security monitoring system 100 may be used to monitor, surveil, and protect property 101. For instance, the central monitoring control unit 102, sensors 104a, 104b, . . . 104g, cameras 106a, 106b, . . . 106f, holographic projectors 108a, 108b, 108c, robotic devices 110a, 110b, . . . 110g, and/or the wireless charging stations 112a, 112b, 112c may each function in the same, or substantially similar, manner as described with respect to the security monitoring system 100.

System 900 is different in at least one respect from system 100. For instance, system 900 may facilitate access to one or more of the central monitoring control unit 102, multiple sensors 104a, 104b, . . . 104g, cameras 106a, 106b, . . . 106f, holographic projectors 108a, 108b, 108c, robotic devices 110a, 110b, . . . 110g, and/or wireless charging stations 112a, 112b, 112c by a user residing at a remote location 910. The remote user 950 may be a central station operator, a law enforcement officer, or a lawful occupant of property 901 who may be at work, on vacation, or the like. Other types of users may also be able to access components of system 901 in the same, or substantially similar, manner as remote user 950.

For instance, a remote user 950 may be able to utilize an application provided via a virtual reality headset 954 to submit a request to access one or more components of system 900. The request may be directed to the central monitoring control unit 102 via a network 960. A local network 911 and one or more wired or wireless communications links 962 may be utilized in order to connect the user's 950 virtual reality headset 954 to the network 960 and network 111 that hosts the central monitor control unit 102.

The network 960 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 960 may include multiple networks or subnetworks, each of which may include, for example, a wired or wireless data pathway. The network 960 may include a circuit-switched network, a packet-switched data network, or any other network able to carry electronic communications (e.g., data or voice communications). For example, the network 960 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 960 may include one or more networks that include wireless data channels and wireless voice channels. The network 960 may be a wireless network, a broadband network, or a combination of networks including a wireless network and a broadband network.

In one aspect, the application provided via the virtual reality headset 954 may require user authentication prior to providing the user with access to one or more components of system 900. For instance, when the user 950 is a lawful occupant of the property 901, the application provided by the virtual reality headset 954 may merely require the user to enter authenticating credentials for the user's account. In one implementation, the authentication credentials may include a username and password. Other types of authentication procedures may also be employed to prevent unauthorized access to security monitoring system 900 by a remote user 950. For instance, a user may be required to submit to one or more types of biometric data such as, for example, a retina scan, a facial recognition scan, voice verification, or the like prior to using application provided via the virtual reality headset 954 to access the security monitoring system 900. Alternatively, or in addition, a user may be required to enter a dynamically changing personal identification number that is generated by a personal identification number generation unit in the possession of the user. Such a dynamically changing personal identification number may be provided in addition to a user name and password, and must match a corresponding dynamically changing identifier generated by the system 900 before the system 900 will grant access to the user 950.

Other users may request authorization to use a virtual reality headset 954 to access one or more components of security monitoring system 900 that are not lawful occupants of the property 901. Such users may have to satisfy one or more additional layers of authentication screening. For instance, in addition to input of a username and password, biometric data, and/or a dynamically changing personal identification number, users who are not lawful occupants of the property 901 may need to seek permission to access one or more components of system 900 from a lawful occupant of property 901. Such permission may be granted without restriction by the lawful occupant of property 901. Alternatively, such access may be conditionally granted by the lawful occupant of property 901. For instance, a lawful occupant of property 901 may indicate that the central operator, law enforcement officer, and/or other user may access one portions of the property 901 such as, for example the living room, but not, for example the bedroom. Such an additional layer of authentication for users such as central operators and/or law enforcement officers, who are not lawful occupants of the property, may be implemented to protect the privacy of the lawful occupants of the property 901 that may reside within the property 901.

In one implementation, a user 950 may be able to receive alarm event notifications via the user's 950 mobile device 952. In response to such an alarm event notification, and once fully authenticated, the remote user 950 may use the application provided via the virtual reality headset 954 to request access to a video feed from a particular camera such as camera 106a, 106b, 106c, 106d, 106e, 106f. The video feed may be streamed to the user's 950 virtual reality headset 954. The user 950 may be able to control one or more of the cameras 106a, 106b, 106c, 106d, 106e, 106f to alter the field of view one or more of the cameras using the virtual reality headset 954, which may be synced to one or more cameras. Thus, the user 952 may be able to monitor a home invasion, as it occurs in real-time. Though a user may determine to use a virtual reality headset 954 to access network 950 in order to monitor a home invasion in response to the receipt of an alarm event notification, the present disclosure need to be so limited. Instead, the user 950 may be able to utilize the virtual reality headset 954 to connect to the network 900 at any time, and for any reason, in order to access one or more cameras 106a, 106b, 106c, 106d, 106e, 106f.

Per the example of FIG. 9, a remote user 950, once authenticated, may use the virtual reality headset 954 to connect to the network 900 in order to access one or more cameras 106a, 106b, . . . 106f. Alternatively, or in addition, the user 950 may use the virtual reality headset 954 to access a camera 117a, 117f, 117g associated with one or more robotic devices 110a, 110f, 110g, respectively. The remote user 950 may use the access to one or more video feeds associated with one or more of the aforementioned cameras in order to guide the user 960 out of the property 901 to safety during a home invasion For instance, the user 950 may use the virtual reality headset 954 to access the video feeds associated with cameras 117d, 106f, 106d, and 106e in order to determine that the user may safely exit down the back steps in room B, and out the back door without encountering any burglars 140a, 140b, 140c, 140d.

Alternatively, or in addition, the remote user 950 may be able to access one or more holographic projectors 108a, 108b, 108c in order to assist the user's 962 escape. For instance, the user 950 may utilize the display of the virtual reality headset 954 to provide a three-way split screen. The three-way split screen may include a live video feed from camera 106a, camera 106f, and camera 106d. Thus, the user 950 can monitor the burglar 140d, as the burglar 140d climbs the stairs using the video feed from camera 106a. While the user climbs the stairs, the user 950 can simultaneously monitor the video feed from camera 106d to ensure the back steps remain clear. Simultaneously, the user may also monitor camera 106f to determine when the burglar 140d is reaching the top of the staircase. As the burglar 140d reaches the top of the staircase, the user 950 may submit a command via the virtual reality headset 954 to instruct the holographic projector 108c to display a vicious, barking dog hologram 109c. The vicious, barking dog hologram may be introduced organically by, for example, instructing one or more holographic projectors to display a vicious, barking dog running from the edge of Room D towards the top of the stairs. The hologram of the vicious, barking dog may startle the burglar 140d just enough so that the user 962 that was hiding in Room C may exit the property 901 down the back stairs in Room B, and out the back door.

Figure 10:
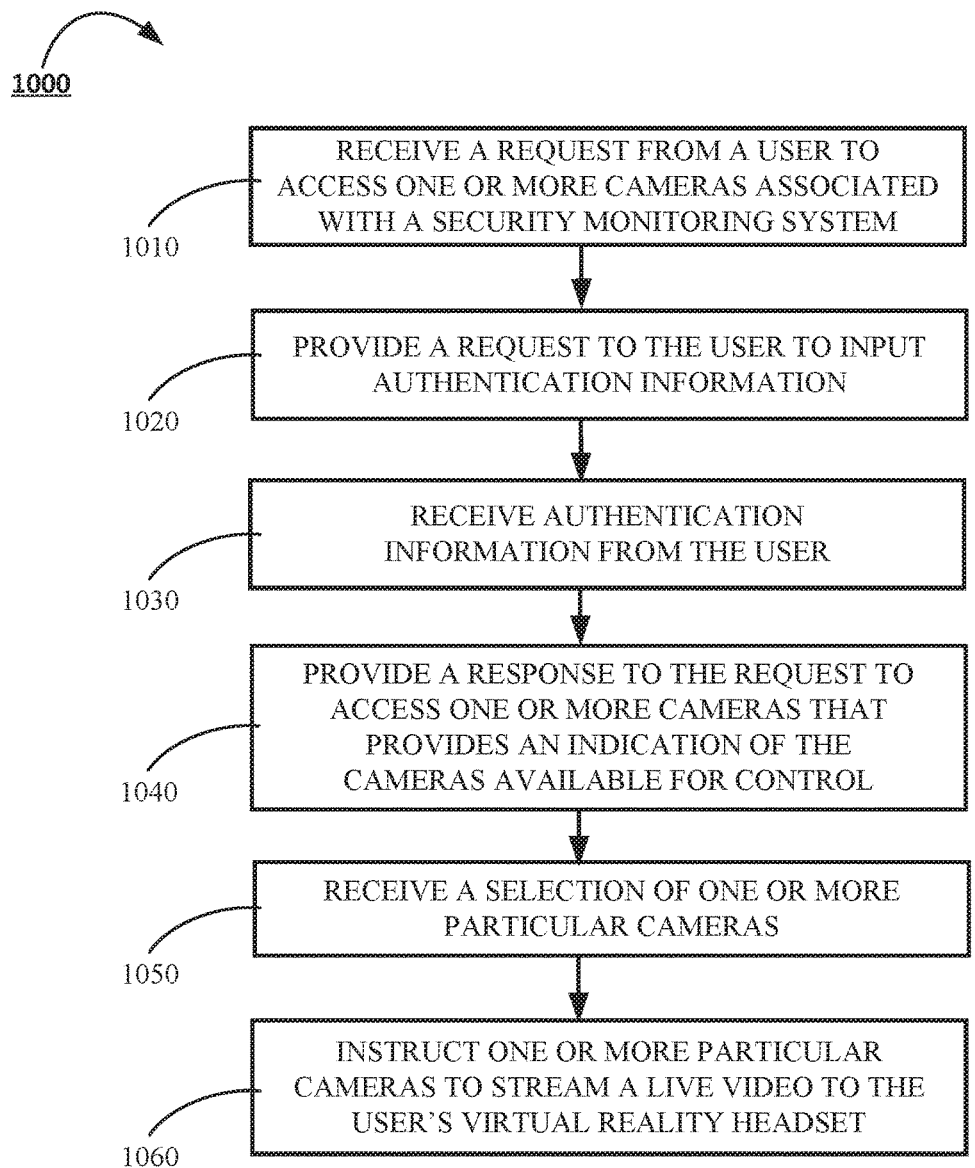
FIG. 10 is a flowchart of a process that facilitates remote user interaction with a security monitoring system utilizing a virtual reality headset.

FIG. 10 is a flowchart of a process 1000 that facilitates remote user interaction with a security monitoring system utilizing a virtual reality headset.

The process 1000 may begin at 1010 when the central monitoring control unit 102, or other component of system 900, receives a request from a user's virtual reality headset 954 to access one or more components of system 900. The request may include, for example, a request to control one or more cameras 106a, 106b, . . . 106f.

The central monitor control unit 102 may implement a firewall, and/or other security measures that may prohibit outside devices from gaining unauthorized access to security monitoring system 900. For instance, the central monitor control unit 102 may provide 1020 a request to the user to input authentication information before granting the user 950 access to one or more cameras 106a, 106b, . . . 106f. In some implementations, the user 950 may need to only provide a username and password in order to be authenticated. Alternatively, a user 950 may also be required to provide one or more types of biometric data, a dynamically generated personal identification number, or the like in response to a request for authentication information.

However, in some instances, additional measures may need to be taken before a user 950 is fully authenticated. For instance, if the user 950 is an operator, law enforcement officer, or any user that is not a lawful occupant of property 901, the user 950 may also seek the approval of a lawful occupant of the property 901. Such approval may be sought by the operator, law enforcement officer, or the like sending a request for permission to access the security monitoring system 900 to a mobile device utilized by a lawful occupant of the property. The lawful occupant of the property may accept, or deny, access to the third party operator, law enforcement operator, or the like.

Once the central monitor control unit 102 receives 1030 the user's 950 authentication information, and fully authenticates the user 950, the central monitor control unit 102 may provide 1040 a response to the user's 950 request to control one or more cameras 106a, 106b, . . . 160f. The response may include, for example, the central monitoring control unit 102 providing, for display on the user interface of the user's 950 virtual reality headset 954, one or more graphical icons that each corresponds to a particular camera 106a, 106b, . . . 106f. The one or more graphical icons that each correspond to a particular camera 106a, 106b, . . . 106f may be selectable. The displayed graphical icons may be presented in the same, or similar, manner as the alarm event management center described in reference to FIG. 2 and FIG. 3. Alternatively, or in addition, the display of graphical icons may also include any cameras that are coupled to a robotic device such cameras 117a, 117d, 117f, 117g.

The user may interact with the user interface of the virtual reality headset 954 to select one or more cameras. For instance, the user 950 may select one or more graphical icons that correspond to a particular camera(s) from the set of multiple available cameras. Data indicative of the user's selection may be received 1050 by the central monitor control unit 102. The central monitor control unit 102 may transmit one or more instructions 1060 to the camera(s) that correspond to the user's selection to command the cameras to transmit a live video feed to the user's virtual reality headset 954 from the camera(s) selected by the user. To the extent the user selects two or more cameras, the live video feed from the two or more cameras may be provided for display via the user interface of the virtual reality headset 954 using a split-screen format. The one or more instructions transmitted from the central monitor control unit 102 to the one or more cameras may include an instruction to sync with virtual reality headset 954 to the one or more cameras.

The graphical icons may continue to be displayed as the user 950 investigates aspects of the property via the video feeds provided from the selected camera(s). Accordingly, the user may continue to navigate the property 901 by selecting one or more different video feeds.

Figure 11:
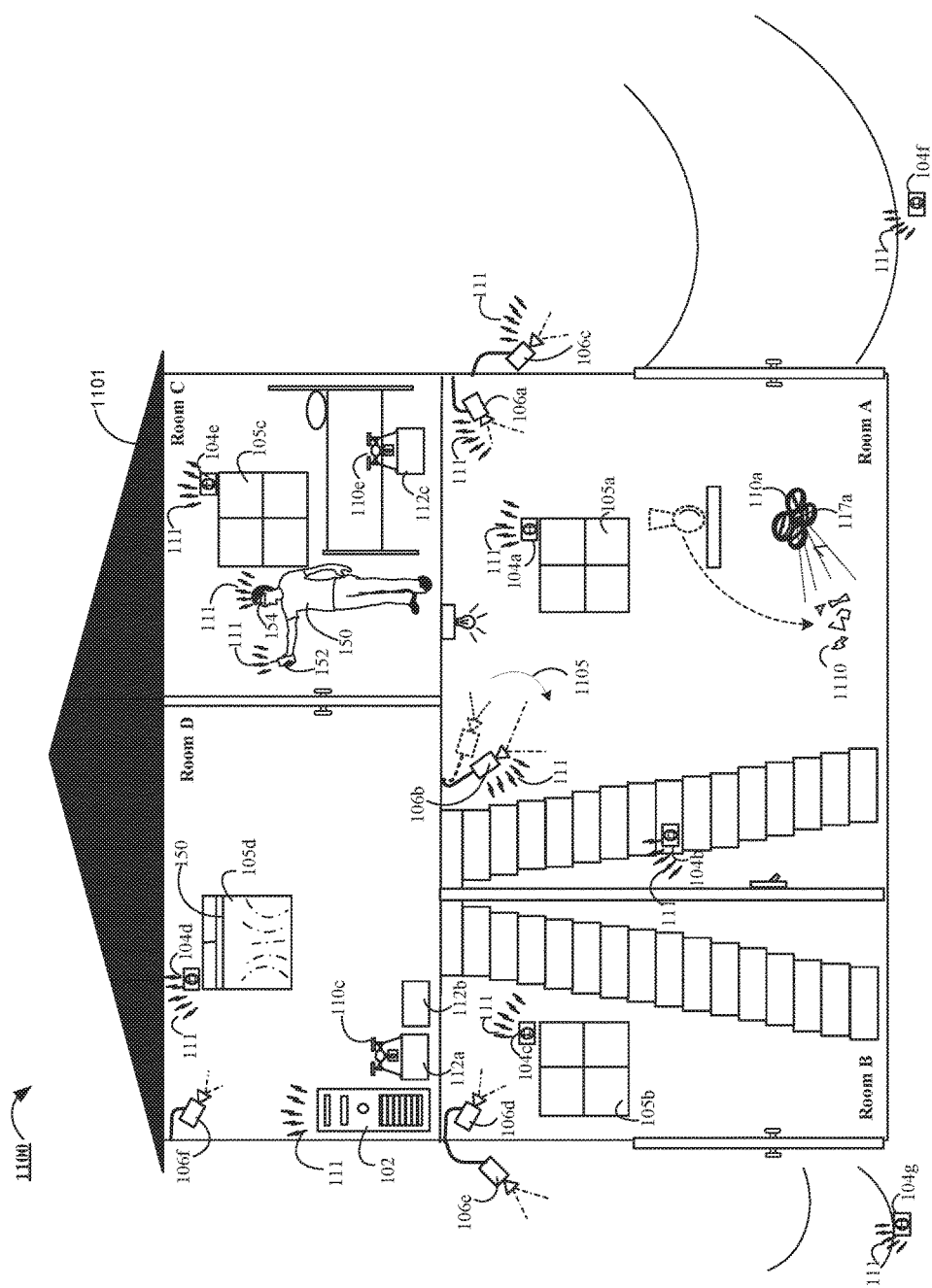
FIG. 11 is a contextual diagram of an example of a user interacting with the security monitoring system using a virtual reality headset to investigate a loud noise in the middle of the night.

FIG. 11 is a contextual diagram of an example of a user interacting with the security monitoring system 1100 using a virtual reality headset 154 to investigate aloud noise in the middle of the night.

In some instances, the virtual reality headset 154 may be used to investigate portions of a property 1101 absent the detection of an alarm event. For instance, a user 154 may be awakened in the middle the night by a loud noise that came from Room A. In this example, the user 154 may get out of bed, and obtain the virtual reality headset 154. The user 154 may transmit a request to access one or more cameras 106a, 106b, 106c, 106d, 106e, 106f, 117a to the central monitor control unit 102 so that the user 150 may determine the source of the noise. In response to the user's 154 request, the user 154 may be provided with a display of graphical icons that each correspond to a particular camera that is associated with the property 1101. The cameras associated with the property 1101 may include cameras 106a, 106b, . . . 106f and/or cameras 117a that are equipped to a robotic device 110a.

A user 154 may select a graphical icon that corresponds to camera 106b from the list of multiple graphical icons associated with the cameras of property 1101. In response to the user's 154 selection, the central monitoring control unit 102 may instruct the camera 106b to provide a live video feed to the user's virtual reality headset 154. Alternatively, or in addition, the central monitoring control unit 154 may instruct the camera 106b to sync with the user's 150 virtual reality headset 154. When synced, movements of the user's 150 virtual reality headset 154 may also move 1105 the camera 106b. For instance, the user 150 may move 1105 the camera 106b around to view different aspects of Room A. Using the virtual reality headset 154, the user may discover that the source of the crash that caused the user 150 to awaken in the middle of the night was merely a vase 1110 that had fallen off a shelf and shattered.

Alternatively, or in addition, the user 150 may interact with the user interface of the virtual reality headset 154 to instruct a robotic device 110a with a camera 117a to further investigate the crash in Room A. The camera 117a of robotic device 110a may similarly be synced to the movements of the virtual reality headset 154. The user 150 may direct the camera of the robotic device 110a to focus on the shattered pieces of the vase 1110 on the floor of Room A. Thus, the user can confirm, from the safety of the user's 150 bedroom that the property 1101 is clear of intruders.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A monitoring system, comprising:
   a virtual reality headset;
   a plurality of cameras;
   a plurality of sensors located at different locations in a property, wherein the plurality of sensors include a first sensor;
   a monitoring control unit, wherein the monitoring control unit includes:
      a network interface;
      one or more processors; and
      one or more storage devices that include instructions that are operable, when executed by the one or more processors, to cause the one or more processors to perform operations comprising:
         receiving data from the first sensor that is indicative of an event;
         transmitting a notification that includes data used to initiate generation of a prompt, for display on a user interface of the virtual reality headset, that is indicative of one or more objects moving within a vicinity of the one or more sensors;

providing for display on a user interface of the virtual reality headset a graphical icon that corresponds to a first camera of the plurality of cameras that is associated with the one or more sensors;

receiving a selection of the particular graphical icon; and in response to receiving the selection of the particular graphical icon, transmitting one or more instructions to the first camera that is associated with the one or more sensors to stream a first live video feed of a portion of the property that is within a vicinity of the one or more sensors to the user interface of the virtual reality headset, wherein the virtual reality headset is configured to transition from outputting the first live video feed from the first camera for display on the user interface of the virtual reality headset to outputting a second live video feed from a second camera for display on the user interface of the virtual reality headset in response to one or more movements of a head of a user wearing the virtual reality headset.

2. The monitoring system of claim 1, the operations further comprising:

transmitting, to the virtual reality headset, a request for authentication information; and receiving authentication information from the user.

3. The monitoring system of claim 1, the operations further comprising:

transmitting one or more instructions to the first camera that is associated with the particular graphical icon that commands the first camera to sync with the virtual reality headset.

4. The monitoring system of claim 1, wherein the plurality of cameras includes at least one camera that is coupled to a robotic device.

5. The monitoring system of claim 1, wherein the graphical icon is configured to visually indicate a current threat level associated with a portion of the property where the camera that corresponds to the graphical icon is located.

6. The monitoring system of claim 5, wherein the current threat level is determined based on data from one or more sensors of the plurality of sensors associated with the portion of the property.

7. The monitoring system of claim 1, wherein the virtual reality headset is configured to detect the one or more movements of the head of the user wearing the virtual reality headset using (i) one or more accelerometers, (ii) one or more gyroscopes, or (iii) a combination of at least one accelerometer and at least one gyroscope.

8. The monitoring system of claim 1, wherein the virtual reality headset is configured to determine a position of a head of the user in a three-dimensional space.

9. The monitoring system of claim 1, wherein the virtual reality headset includes a camera that is configured to detect one or more movements of one or more eyes of the user.

10. The monitoring system of claim 9, wherein the virtual reality headset is configured to communicate with the first camera to control zoom functions of the first camera in response to the one or more movements of the eyes of the user detected by the camera that is included in the virtual reality headset.

11. The monitoring system of claim 9, wherein the virtual reality headset is configured to communicate with the second camera to control zoom functions of the second camera in response to the one or more movements of the eyes of the user detected by the camera that is included in the virtual reality headset.

12. The monitoring system of claim 9, wherein the virtual reality headset is configured to communicate with the first camera to initiate tracking an object in response to the one or more movements of the eyes of the user detected by the camera that is included in the virtual reality headset.

13. The monitoring system of claim 9, wherein the virtual reality headset is configured to communicate with the second camera to initiate tracking an object in response to the one or more movements of the eyes of the user detected by the camera that is included in the virtual reality headset.

14. The monitoring system of claim 12, wherein tracking the object includes the virtual reality headset communicating with the first camera to continuously track the object from a first object location to a second object location.

15. The monitoring system of claim 14, wherein the first object location is in the field of view of the first camera and the second object location is in the field of view of the second camera.

16. The monitoring system of claim 14, wherein continuously tracking the object includes transitioning an output on the display of the virtual reality headset from the live video feed from the first camera to the live video feed from the second camera in response to the object moving from a field of view of the first camera to a field of view of the second camera.

* * * * *